(12) United States Patent
Yang et al.

(10) Patent No.: US 10,560,532 B2
(45) Date of Patent: Feb. 11, 2020

(54) QUICK RELAY SESSION MANAGEMENT PROTOCOL

(71) Applicant: Apple Inc., Cupertino, CA (US)

(72) Inventors: Yan Yang, San Jose, CA (US); Joe S. Abuan, Cupertino, CA (US); Thuy Park, San Jose, CA (US); Berkat S. Tung, San Jose, CA (US)

(73) Assignee: Apple Inc., Cupertino, CA (US)

( * ) Notice: Subject to any disclaimer, the term of this patent is extended or adjusted under 35 U.S.C. 154(b) by 187 days.

(21) Appl. No.: 15/713,336

(22) Filed: Sep. 22, 2017

(65) Prior Publication Data
US 2018/0091600 A1    Mar. 29, 2018

Related U.S. Application Data

(60) Provisional application No. 62/399,162, filed on Sep. 23, 2016, provisional application No. 62/399,159, filed on Sep. 23, 2016, provisional application No. 62/399,163, filed on Sep. 23, 2016.

(51) Int. Cl.
| | | |
|---|---|---|
| *H04L 29/08* | (2006.01) | |
| *H04W 76/10* | (2018.01) | |
| *H04B 7/155* | (2006.01) | |
| *H04W 4/80* | (2018.01) | |
| *H04L 29/06* | (2006.01) | |
| *H04W 84/12* | (2009.01) | |

(52) U.S. Cl.
CPC ........... *H04L 67/141* (2013.01); *H04B 7/155* (2013.01); *H04L 67/28* (2013.01); *H04W 76/10* (2018.02); *H04L 67/42* (2013.01); *H04W 4/80* (2018.02); *H04W 84/12* (2013.01)

(58) Field of Classification Search
None
See application file for complete search history.

(56) References Cited

U.S. PATENT DOCUMENTS

| | | | |
|---|---|---|---|
| 9,325,941 | B2 | 4/2016 | Yang et al. |
| 9,680,646 | B2 | 6/2017 | Nadathur et al. |
| 10,028,309 | B2 | 7/2018 | Aliyar |
| 10,057,062 | B2 | 8/2018 | Nadathur et al. |
| 10,084,904 | B2 | 9/2018 | De Filippis et al. |
| 2004/0111652 | A1 | 6/2004 | Shoaib et al. |

(Continued)

*Primary Examiner* — Philip J Chea
*Assistant Examiner* — Hassan A Khan
(74) *Attorney, Agent, or Firm* — Dickinson Wright RLLP

(57) ABSTRACT

When direct communication between devices, such as via Bluetooth, is unavailable, a communication protocol is used by an initiating communication device and/or a recipient communication device to establish a communication session via a cloud-based relay server. This communication protocol efficiently allocates (or binds) the initiating communication device, the recipient communication device, and the relay server together for the communication session. The communication protocol may include handshaking messages that specify a transport type and channel used for connections in the communication session, as well as an address of the relay server. After the communication session is confirmed, the communication protocol allows the initiating communication device and the recipient communication device to share messages even when physically separated from each other.

20 Claims, 25 Drawing Sheets

(56) References Cited

U.S. PATENT DOCUMENTS

| | | | |
|---|---|---|---|
| 2011/0064018 A1* | 3/2011 | Hottinen | H04W 72/046 370/315 |
| 2014/0156854 A1* | 6/2014 | Gaetano, Jr. | H04L 65/1069 709/227 |
| 2014/0188837 A1* | 7/2014 | Zhou | G06F 16/2465 707/709 |
| 2015/0172333 A1* | 6/2015 | Lindstrom | H04L 65/1016 370/261 |
| 2015/0350599 A1* | 12/2015 | Yang | H04N 7/15 348/14.02 |
| 2016/0135042 A1* | 5/2016 | Netto | H04W 12/04 380/270 |
| 2016/0191461 A1* | 6/2016 | Wang | H04L 65/103 709/227 |
| 2016/0219435 A1* | 7/2016 | Mistry | H04W 12/06 |
| 2016/0366195 A1* | 12/2016 | Pattekar | H04L 65/1086 |
| 2018/0091215 A1 | 3/2018 | Yang et al. | |
| 2018/0091601 A1 | 3/2018 | Yang et al. | |

* cited by examiner

QUICK RELAY SESSION MANAGEMENT PROTOCOL

CROSS-REFERENCE TO RELATED APPLICATIONS

This Application claims the benefit of U.S. Provisional Patent Application No. 62/399,162, entitled "QUICK RELAY SESSION MANAGEMENT PROTOCOL" filed Sep. 23, 2016, U.S. Provisional Patent Application No. 62/399,159, entitled "QUICK RELAY INTERFACE AND TRANSPORT SELECTION" filed Sep. 23, 2016, and U.S. Provisional Patent Application No. 62/399,163, entitled "QUICK RELAY TRAFFIC MANAGEMENT FOR CLOUD MESSAGING" filed Sep. 23, 2016, the contents of all of which are incorporated by reference herein in their entirety for all purposes.

FIELD

The described embodiments relate, generally, to wireless communication among electronic devices, including establishing and managing relayed communication channels between electronic devices via a relay server.

BACKGROUND

Many electronic devices often work in tandem with each other. For example, wearable or accessory electronic devices (such as smart watches) often communicate data, configuration information and/or control information with a companion electronic device (such as a smart phone, a tablet computer or a laptop computer) via a short-range communication protocol, such as Bluetooth® (from the Bluetooth Special Interest Group in Kirkland, Wash.).

However, when the companion electronic device is not proximate to the wearable electronic device, communication via Bluetooth may not be possible. In principle, the companion electronic device and the wearable electronic device can communicate with each other via an intermediate electronic device. For example, the companion electronic device and the wearable electronic device can each communicate with a cloud-based service via an access point in a wireless local area network (WLAN) that is compatible with an Institute of Electrical and Electronics Engineers (IEEE) 802.11 standard (which may also be referred to as 'Wi-Fi').

In practice, indirect communication via a cloud-based service can be time consuming because of long set-up time needed to establish connections and latency associated with signaling overhead. These time delays may degrade the performance or disrupt time-sensitive applications that are executing on the wearable electronic device and/or the companion electronic device.

SUMMARY

Embodiments relating to an initiating communication device that establishes a communication session with a recipient communication device are described. During operation, the initiating communication device may transmit, to an allocation server, an allocate request for allocation of a relay server, and may receive, from the allocation server, an allocate response with information identifying the relay server. The initiating communication device may transmit, to the relay server, a binding request to bind the initiating communication device to the relay server in the communication session, and may receive, from the relay server, a binding response. Moreover, the initiating communication device may transmit, to the relay server, a first connection indication for the communication session. Subsequently, the initiating communication device may receive, directly or indirectly from the recipient communication device, an acceptance response for the communication session. After the recipient communication device has performed the binding with the relay server, the initiating communication device may transmit, to the relay server, a second connection indication, and may receive, from the relay server, a session-connected response that acknowledges that the communication session has been established with the recipient communication device.

Using the communication session, the initiating communication device may send first data to and/or receive second data from the recipient communication device via the relay server.

Moreover, the allocate request may be communicated to the allocation server via an intermediate server. In some embodiments, prior to transmitting the allocate request, the initiating communication device sends, to the intermediate server, an invitation request to establish the communication session via the relay server.

Furthermore, the information identifying the relay server may include an address of the relay server.

Additionally, the binding request may specify a transport type for a connection between the initiating communication device and the relay server in the communication session and/or the binding response may specify a channel number for the communication session.

Note that the first connection indication for the communication session may specify the transport type and a radio access technology.

Moreover, the initiating communication device may receive, from the relay server, a reallocate indication indicating that another relay server be used for the communication session. For example, the reallocate indication may be based on a location of the initiating communication device. In response, the initiating communication device may send, to the relay server, a reallocation request, and may receive, from the relay server, a reallocation response.

Furthermore, after a time interval without communication with the recipient communication device via the relay server, the initiating communication device may transmit a keep-alive message to the relay server.

Additionally, the initiating communication device may establish a peer-to-peer (P2P) link with the recipient communication device via the relay server by transmitting, to the relay server, a P2P-connection request, which is forwarded to the recipient communication device.

In some embodiments, the initiating communication device may discontinue the communication session by transmitting, to the relay server, a disconnect request.

Note that the initiating communication device may include at least one processor, and memory that stores a program module that, when executed by the at least one processor, performs at least some of the aforementioned operations.

Other embodiments provide the relay server or the recipient communication device.

Still other embodiments provide a computer-program product for use with the initiating communication device, the recipient communication device or the relay server. This computer-program product includes instructions for at least some of the aforementioned operations (or corresponding counterpart operations) performed by the initiating communication device, the recipient communication device or the relay server.

Still other embodiments provide a method for establishing the communication session. The method includes at least some of the aforementioned operations (or corresponding counterpart operations) performed by the initiating communication device, the recipient communication device or the relay server.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
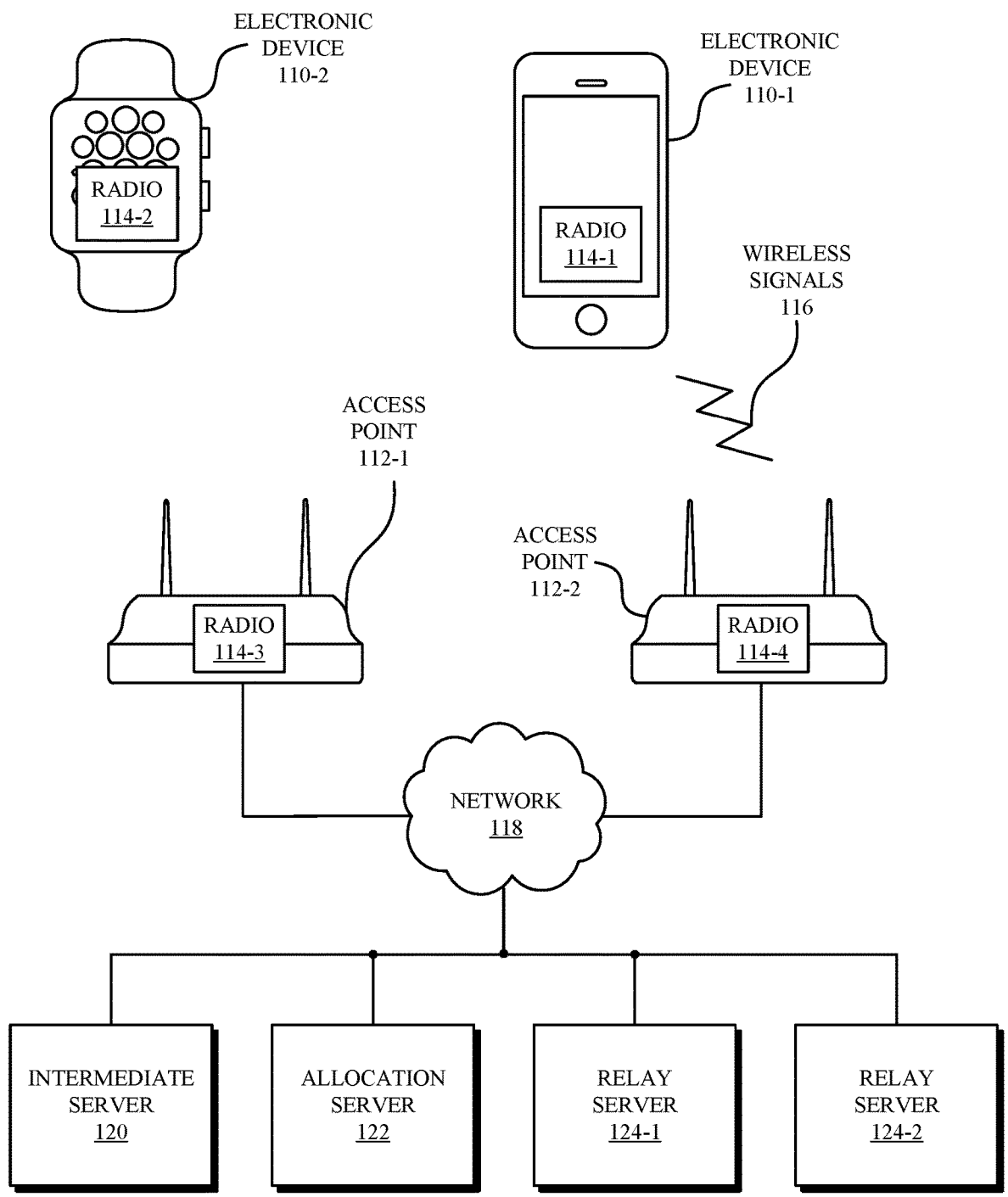
FIG. 1 is a block diagram illustrating an example of electronic devices communicating wirelessly.

When direct communication (such as via Bluetooth) is unavailable, a quick relay communication protocol may be used by an initiating communication device (such as a wearable electronic device, e.g., a smart watch) and/or a recipient communication device (such as a companion electronic device to the wearable electronic device, e.g., a smart phone, a tablet computer or a laptop computer) to establish a communication session via a cloud-based relay server. This quick relay communication protocol may efficiently allocate or bind the initiating communication device, the recipient communication device and the relay server in the communication session. Moreover, the quick relay communication protocol may include handshaking messages that specify the transport type and channel used in the connections in the communication session, as well as the address of the relay server. After the communication session has been confirmed by the initiating communication device sending a second connection indication to the relay server and receiving an acknowledgment from the relay server, the quick relay communication protocol may allow the initiating communication device and the recipient communication device to communicate data in the communication session via the relay server.

By establishing the communication session, this communication technique may allow the initiating communication device and the recipient communication device to share messages even when they are physically distant from each other. Moreover, by efficiently establishing the communication session, the communication technique may reduce the set-up time that is typically needed to establish communication between the initiating communication device and the recipient communication device in existing communication protocols, as well as the latency associated with communication between the initiating communication device and the recipient communication device. Consequently, the communication technique may facilitate improved performance of time-sensitive applications that are executing on the initiating communication device and/or the recipient communication device. Therefore, the communication technique may improve the user experience when using the initiating communication device and/or the recipient communication device.

Note that the communication by the initiating communication device and the recipient communication device in the quick relay communication protocol may be compatible with a variety of wireless communication protocols, such as: Bluetooth, an IEEE 802.11 standard, a cellular-telephone communication protocol and/or another wireless communication protocol. In the discussion that follows, Wi-Fi communication with an access point that communicates with a cloud-based relay server using an IEEE 802.3 compatible communication protocol (which is sometimes referred to as 'Ethernet') is used as an illustration. However, the communication technique may also be used with a wide variety of other communication protocols, and in access points and electronic devices (such as portable electronic devices or mobile devices) that can incorporate multiple different radio access technologies (RATs) to provide connections through different wireless networks that offer different services and/or capabilities.

The initiating communication device and/or the recipient communication device (either of which are sometimes referred to as an 'electronic device') can include hardware and/or software to support a wireless personal area network (WPAN) according to a WPAN communication protocol, such as those standardized by the Bluetooth Special Interest Group (in Kirkland, Wash.) and/or those developed by Apple (in Cupertino, Calif.) that are referred to as AWDL. Moreover, the electronic device can communicate via: a wireless wide area network (WWAN), a wireless metro area network (WMAN) a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a P2P communication technique.

The electronic device, in some embodiments, can also operate as part of a wireless communication system, which can include a set of client devices, which can also be referred to as stations (STAs), client electronic devices, or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via Ethernet.

Additionally, it should be understood that the electronic devices described herein may be configured as multi-mode wireless communication devices that are also capable of communicating via, e.g., different 3G and/or second generation (2G) RATs. In these scenarios, a multi-mode electronic device or user equipment (UE) can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' electronic device, 'mobile device,' communication device, 'mobile station,' wireless station, 'wireless access point,' station, 'access point' and 'user equipment' (UE) may be used herein to describe one or more consumer electronic devices that may be capable of performing procedures associated with various embodiments of the disclosure.

Note that the term 'configured to' is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the 'configured to' language include hardware (e.g., circuits, memory storing program instructions executable to implement the operation, etc.). Reciting that a unit/circuit/component is 'configured to' perform one or more tasks is expressly intended not to invoke interpretation under 35 U.S.C. § 112(f) for that unit/circuit/component.

We now describe embodiments of the communication technique. FIG. 1 presents a block diagram illustrating an example of electronic devices communicating wirelessly. One or more electronic devices 110 (such as one or more smart phones, laptop computers, notebook computers, tablets, smart watches, wearable devices, or other such electronic device(s)) may communicate with another of electronic devices 110 using Bluetooth (when these electronic devices are in range). Moreover, one or more of electronic devices 110 and one or more access points 112 may communicate wirelessly in a WLAN using an IEEE 802.11 communication protocol. Thus, one or more of electronic devices 110 may be associated with the same or different access points 112. For example, electronic devices 110 and access points 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include requests, responses or acknowledgments and/or additional information, such as data, as payloads). Note that access points 112 may provide access to a network, such as the Internet, (e.g., via an Ethernet protocol) and may be a physical access point or a virtual or 'software' access point that is implemented on a computer or an electronic device.

As described further below with reference to FIG. 25, electronic devices 110 and access points 112 may include subsystems, including any or all of a networking subsystem, a memory subsystem, and a processor subsystem. In addition, electronic devices 110 and access points 112 may include radios 114, e.g., in the networking subsystems. More generally, electronic devices 110 and access points 112 can be implemented as (or can be included within) any electronic devices with networking subsystems that enable electronic devices 110 and access points 112 to wirelessly communicate with one or more other electronic devices. This can include transmitting beacons on wireless channels to enable the electronic devices to make initial contact with or to detect each other, followed by exchanging subsequent data/management frames (such as requests, responses or acknowledgments) to establish a connection, configure security options (e.g., IPSec), transmit and receive packets or frames via the connection, etc.

As can be seen in FIG. 1, wireless signals 116 are communicated by radios 114-1 and 114-4 in electronic device 110-1 and access point 112-2, respectively. More generally, one or more of electronic devices 110 and/or access points 112 may exchange frames using a Wi-Fi communication protocol in a WLAN. As described further below with reference to FIGS. 2-24, electronic device 110-1 (which is sometimes referred to as a 'wearable electronic device' or an 'initiating communication device') and electronic device 110-2 (which is sometimes referred to as a 'companion electronic device' or a 'recipient communication device') may communicate packets or messages with one or more access points 112. Moreover, the one or more access points 112 may communicate, via network 118, the packets or messages to intermediate server 120, allocation server 122 and/or one or more relay servers 124 using Ethernet. Furthermore, one or more of relay servers (such as relay server 124-1) may implement a quick relay communication protocol to efficiently establish a communication session between electronic device 110-1, relay server 124-1 and electronic device 110-2.

In these ways, the communication technique may facilitate improved and efficient communication between electronic devices 110-1 and 110-2 even when electronic devices 110-1 and 110-2 are not proximate to each other (such as when they are not within Bluetooth communication range). This capability may improve the performance of time-sensitive applications (such as video streaming, gaming, etc.) that are executing on electronic devices 110-1 and 110-2.

In the described embodiments, processing a packet or frame in one of electronic devices 110 and/or one of access points 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication technique may be characterized by a variety of communication-performance metrics. For example, the communication-performance metrics may include any/all of: a received signal strength (RSS), a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more, fewer, and/or different electronic devices. As another example, in other embodiments, different electronic devices can be transmitting and/or receiving packets or frames.

Figure 2:
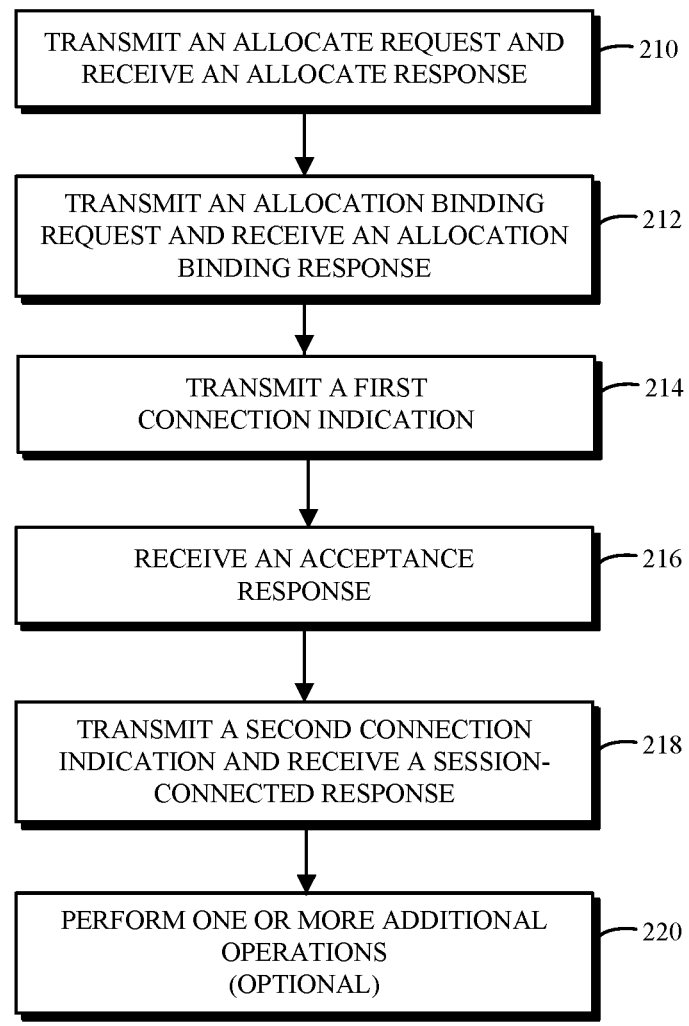
FIG. 2 is a flow diagram illustrating an example of a method for establishing a communication session using at least some of the electronic devices in FIG. 1.

FIG. 2 presents a flow diagram illustrating an example method 200 for establishing a communication session between an initiating communication device and a recipient communication device via a relay server. This method may be performed by an electronic device, such as electronic device 110-1 in FIG. 1. During operation, the initiating communication device may transmit, to an allocation server, an allocate request (operation 210) for allocation of a relay server, and may receive, from the allocation server, an allocate response (operation 210) with information identifying the relay server (e.g., the information identifying the relay server may include an address of the relay server).

Then, the initiating communication device may transmit, to the relay server, an allocation binding request, e.g., an 'Allocbind Request', (operation 212) to bind the initiating communication device and the relay server in the communication session, and may receive, from the relay server, an allocation binding response, e.g., an 'Allocbind Response' (operation 212). Note that the allocation binding request may specify a transport type for a connection between the initiating communication device and the relay server in the communication session and/or the allocation binding response may specify a channel number for this connection in the communication session.

Moreover, the initiating communication device may transmit, to the relay server, a first connection indication (operation 214) for the communication session. Note that the first connection indication for the communication session may specify the transport type and a radio access technology. Subsequently, the initiating communication device may receive, directly or indirectly from the recipient communication device, an acceptance response for the communication session (operation 216). For example, the acceptance response may be received from the recipient communication device via an intermediate server.

After the recipient communication device has performed the binding with the relay server, the initiating communication device may transmit, to the relay server, a second connection indication (operation 218), and may receive, from the relay server, a session-connected response (operation 218) that acknowledges that the communication session has been established with the recipient communication device.

In some embodiments, the initiating communication device optionally performs one or more additional operations (operation 220). For example, using the communication session, the initiating communication device may send first data to and/or receive second data from the recipient communication device via the relay server.

Moreover, the allocate request may be communicated to the allocation server via the intermediate server. In some embodiments, prior to transmitting the allocate request (operation 210), the initiating communication device sends, to the intermediate server, an invitation request to establish the communication session via the relay server.

Furthermore, the initiating communication device may receive, from the relay server, a reallocate indication indicating that another relay server be used for the communication session. For example, the reallocate indication may be based on a location of the initiating communication device. In response, the initiating communication device may send, to the relay server, a reallocation request, and may receive, from the relay server, a reallocation response. Then, the initiating communication device may communicate data with the recipient communication device via the other relay server. Alternatively or additionally, the reallocation may be initiated and performed with the initiating communication device.

Additionally, after a time interval without communication with the recipient communication device via the relay server (such as at least 10-30 s), the initiating communication device may transmit a keep-alive message to the relay server.

In some embodiments, the initiating communication device establishes a P2P link with the recipient communication device via the relay server by transmitting, to the relay server, a P2P-connection request, which is forwarded to the recipient communication device.

Note that the initiating communication device may discontinue the communication session by transmitting, to the relay server, a disconnect request.

Figure 3:
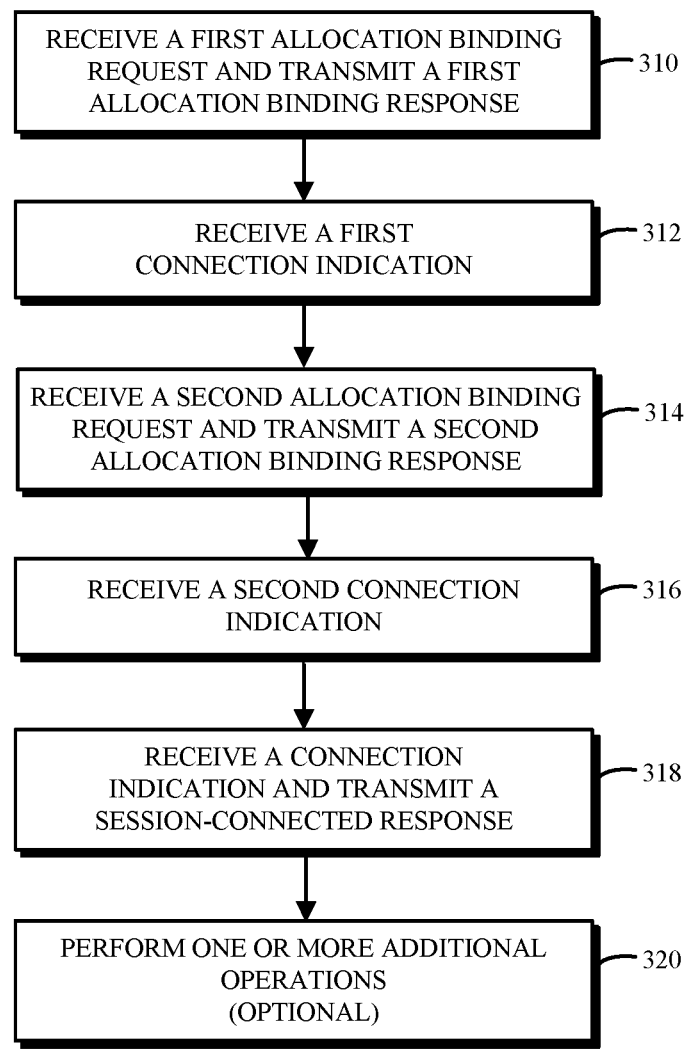
FIG. 3 is a flow diagram illustrating an example of a method for establishing a communication session using at least some of the electronic devices in FIG. 1.

FIG. 3 presents a flow diagram illustrating an example method 300 for establishing a communication session between an initiating communication device and a recipient communication device via a relay server. This method may be performed by a relay server, such as one of relay servers 124 in FIG. 1. During operation, the relay server may receive, from the initiating communication device, a first allocation binding request, e.g., an 'Allocbind Request', (operation 310) to bind the initiating communication device and the relay server in the communication session, and may transmit, to the initiating communication device, a first allocation binding response, e.g., an 'Allocbind Response', (operation 310). Note that the first allocation binding request may specify a transport type for a connection between the initiating communication device and the relay server in the communication session and/or the first allocation binding response may specify a channel number for this connection in the communication session.

Moreover, the relay server may receive, from the initiating communication device, a first connection indication (operation 312) for the communication session. Note that the first connection indication for the communication session may specify the transport type and a radio access technology.

Subsequently, the relay sever may receive, from the recipient communication device, a second allocation binding request, e.g., an 'Allocbind Request', (operation 314) to bind the relay server and the recipient communication device in the communication session, and may transmit, to the recipient communication device, a second allocation binding response, e.g., an 'Allocbind Response', (operation 314). Note that the second allocation binding request may specify a transport type for a connection between the recipient communication device and the relay server in the communication session and/or the second allocation binding response may specify a channel number for this connection in the communication session.

Next, the relay server may receive, from the initiating communication device, a second connection indication (operation 316). After receiving a connection indication (operation 318) from the recipient communication device, the relay server may send, to the initiating communication device, a session-connected response (operation 318) that acknowledges that the communication session has been established with the recipient communication device.

In some embodiments, the relay server optionally performs one or more additional operations (operation 320). For example, using the communication session, the relay server may facilitate communication of data between the initiating communication device and the recipient communication device.

Moreover, the relay server may provide, to the initiating communication device, a reallocate indication indicating that another relay server be used for the communication session. For example, the reallocate indication may be based on a location of the initiating communication device. Then, the relay server may receive, from the initiating communication device, a reallocation request, and may send, to the initiating communication device, a reallocation response. Alternatively or additionally, the reallocation may be initiated and performed with the initiating communication device or the recipient communication device.

Additionally, after a time interval without communication with the recipient communication device via the relay server (such as at least 10 to 30 seconds), the relay server may receive, from the initiating communication device, a keep-alive message. This keep-alive message may be forwarded on to the recipient communication device. Subsequently, a keep-alive response may be received from the recipient communication device, and this keep-alive response may be forwarded on to the initiating communication device.

In some embodiments, the relay server facilitates establishing a P2P link between the initiating communication device and the recipient communication device. Moreover, the relay server may discontinue or disconnect the communication session based on a disconnect request that is received from the initiating communication device and/or the recipient communication device.

Figure 4:
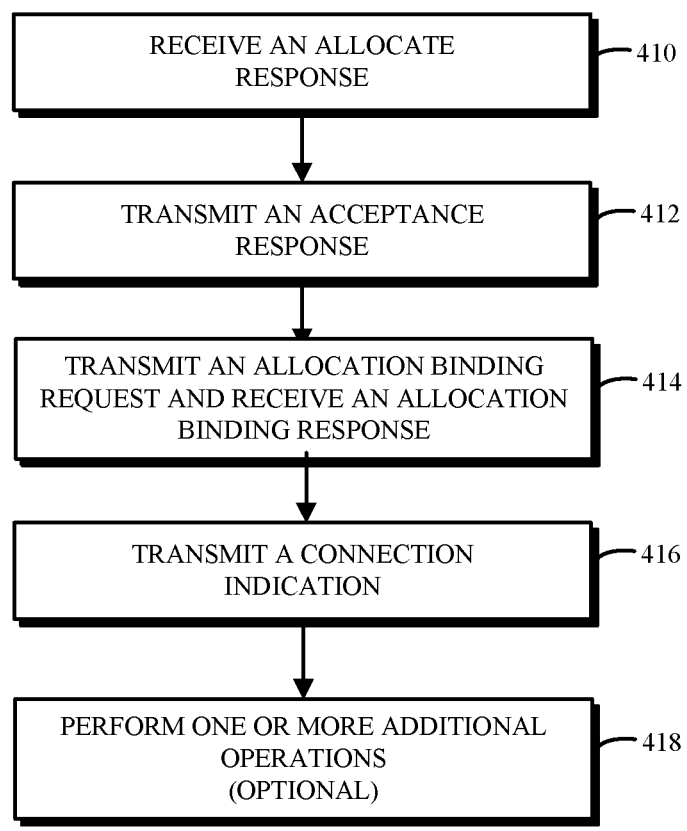
FIG. 4 is a flow diagram illustrating an example of a method for establishing a communication session using at least some of the electronic devices in FIG. 1.

FIG. 4 presents a flow diagram illustrating an example method 400 for establishing a communication session between an initiating communication device and a recipient communication device via a relay server. This method may be performed by an electronic device, such as electronic device 110-2 in FIG. 1. During operation, the recipient communication device may receive, from an allocation server, an allocate response (operation 410) with information identifying the relay server (e.g., the information identifying the relay server may include an address of the relay server).

Then, the recipient communication device may transmit, directly or indirectly to the initiating communication device, an acceptance response for the communication session (operation 412). For example, the recipient communication device may send an acceptance-response request to an intermediate server, and may receive, from the intermediate server, an acceptance-response response. Subsequently, the intermediate server may send the acceptance response to the initiating communication device.

Moreover, the recipient communication device may transmit, to the relay server, an allocation binding request, e.g., an 'Allocbind Request', (operation 414) to bind the relay server and the recipient communication device in the communication session, and may receive, from the relay server, an allocation binding response, e.g., an 'Allocbind Response', (operation 414). Note that the allocation binding request may specify a transport type for a connection between the recipient communication device and the relay server in the communication session and/or the allocation binding response may specify a channel number for this connection in the communication session.

Furthermore, the recipient communication device may transmit, to the relay server, a connection indication (operation 416).

In some embodiments, the recipient communication device optionally performs one or more additional operations (operation 418). For example, using the communication session, the recipient communication device may receive first data from and/or transmit second data to the initiating communication device via the relay server.

Moreover, the allocate response may be communicated from the allocation server via the intermediate server. In some embodiments, prior to receiving the allocate response (operation 410), the recipient communication device receives, from the intermediate server, an invitation to establish the communication session via the relay server.

Furthermore, the recipient communication device may receive, from the relay server, a reallocate indication indicating that another relay server be used for the communication session. For example, the reallocate indication may be based on a location of the recipient communication device. In response, the recipient communication device may send, to the relay server, a reallocation request, and may receive, from the relay server, a reallocation response. Then, the recipient communication device may communicate data with the initiating communication device via the other relay server. Alternatively or additionally, the reallocation may be initiated and performed with the recipient communication device.

Additionally, after a time interval without communication with the initiating communication device via the relay server (such as at least 10-30 s), the recipient communication device may transmit a keep-alive message to the relay server.

In some embodiments, the recipient communication device establishes a P2P link with the initiating communication device via the relay server by transmitting, to the relay server, a P2P-connection request, which is forwarded to the initiating communication device.

Note that the recipient communication device may discontinue the communication session by transmitting, to the relay server, a disconnect request.

Moreover, there may be additional, fewer, or different operations in methods 200 (FIG. 2), 300 (FIG. 3) and/or 400 (FIG. 4). Furthermore, the order of the operations may be changed, and/or two or more operations may be combined into a single operation.

In some embodiments, at least some of the operations in methods 200 (FIG. 2), 300 (FIG. 3) and/or 400 (FIG. 4) are performed by processors in the access point, the relay server, or the electronic devices. For example, at least some of the operations may be performed by a processor that executes a program module or software and/or an interface circuit (such as such as firmware associated with a Media Access Control layer, as well as one or more circuits in a physical layer) in the access point, the relay server, or the electronic device.

REPRESENTATIVE EMBODIMENTS

As an illustration of the communication technique, a wearable electronic device (such as a smart watch) and a companion electronic device (such as a smart phone) may be capable of communicating with each other using cloud-based messaging. Note that the wearable electronic device may be used by a first user and the companion electronic device may be used by a second user, who may be the same as or different from the first user (such as people in the same family). Moreover, note that a companion electronic device-wearable electronic device relationship may mean that it is desired for these devices to share information with each other so that they have common, coordinated or synchronized user data on both devices, such as communication data (emails, texts), media (e.g., songs, images, one-way screen sharing and/or videos), etc. The companion electronic device-wearable electronic device relationship may also mean that the companion electronic device may have the ability to control at least certain aspects of the wearable electronic device, such as the companion electronic device being able to act as a communication proxy for the wearable electronic device or being able to perform management duties (such as data entry and registration) for the accessory device.

For example, the wearable electronic device and the companion electronic device may communicate messages to each other to share information, such as emails, text messages, calendar information, media library items, voice conversations, video, etc. This communication may occur through the use of multiple pipes, e.g., multiple communication mechanisms. Notably, messages may be routed between the wearable electronic device and the companion electronic device may when these devices are directly connected (e.g., via Bluetooth) and when the devices are connected to a common network infrastructure device, such as a common access point. When these direct and/or common infrastructure connections are unavailable, the wearable electronic device and the companion electronic device may communicate messages between them using a relay server. This cloud-based communication may enable the wearable electronic device and the companion electronic device to share messages even when they are physically distant from each other. Thus, if a user walks to a coffee shop with his smart phone, and leaves his smart watch at home (or vice versa), the smart phone and the smart watch may be able to communicate messages with each other via the relay server.

In order to facilitate establishing a communication session in the communication technique, the wearable electronic device and the companion electronic device may each have been previously registered with at least a cloud-based server (such as the intermediate server), which facilitates communication among the wearable electronic device, the allocation server, the relay server and/or the companion electronic device. For example, the registration may be associated with a cloud-based account of one or more users, such as an owner of the wearable electronic device and/or the companion electronic device. In some embodiments, one of the wearable electronic device and the companion electronic device is registered with the cloud-based server, and the other of the wearable electronic device and the companion electronic device may, by virtue of its pairing with the registered device, may be automatically registered to the same cloud-based account.

Figure 5:
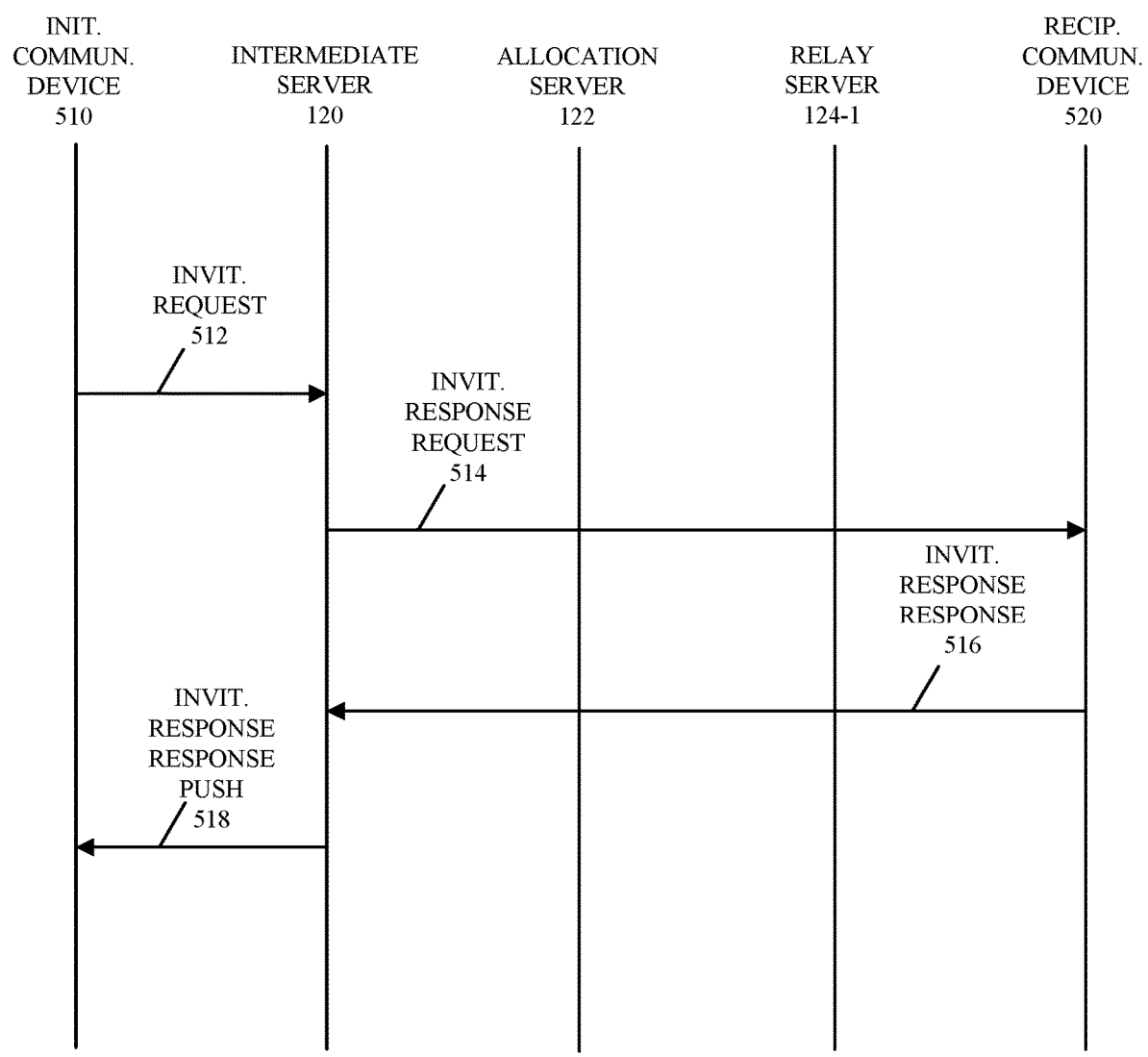
FIG. 5 is a flow diagram illustrating an invitation operation during communication among at least some of the electronic devices in FIG. 1.

We now describe embodiments of the communication protocol in the communication technique. FIG. 5 presents a flow diagram illustrating an invitation operation during communication among at least some of the electronic devices in FIG. 1. During the invitation operation in the communication protocol, initiating communication device 510 may transmit an invitation request 512 to intermediate server 120. For example, a processor executing a program module or software in initiating communication device 510 may instruct an interface circuit in initiating communication device 510 to transmit invitation request 512. This may occur when initiating communication device 510 is unable to directly communicate with recipient communication device 520 (e.g., using Bluetooth), based on a type of message or data being communication (e.g., based on a type of application associated with the data), based on message permissions (e.g., a message priority), based on resource constraints (e.g., residual battery power in initiating communication device 510) and/or based on communication performance. Note that initiating communication device 510 and recipient communication device 520 may be pre-registered with intermediate server 120, e.g., intermediate server 120 may maintain user accounts or cloud-based accounts with information such as the locations or addresses of initiating communication device 510 and recipient communication device 520, as well as those of allocation server 122 and relay servers 124. Intermediate server 120, responsive to receipt of the invitation request 512 from the initiating communication device 510, transmits an invitation response request 514 to the recipient communication device 520, which responds to the intermediate server 120 with an invitation response 516. The intermediate server then sends an invitation response push 518 message to the initiating communication device 510. The intermediate server 120 provides for indirect communication between the initiating communication device 510 and the recipient communication device 520.

Figure 6:
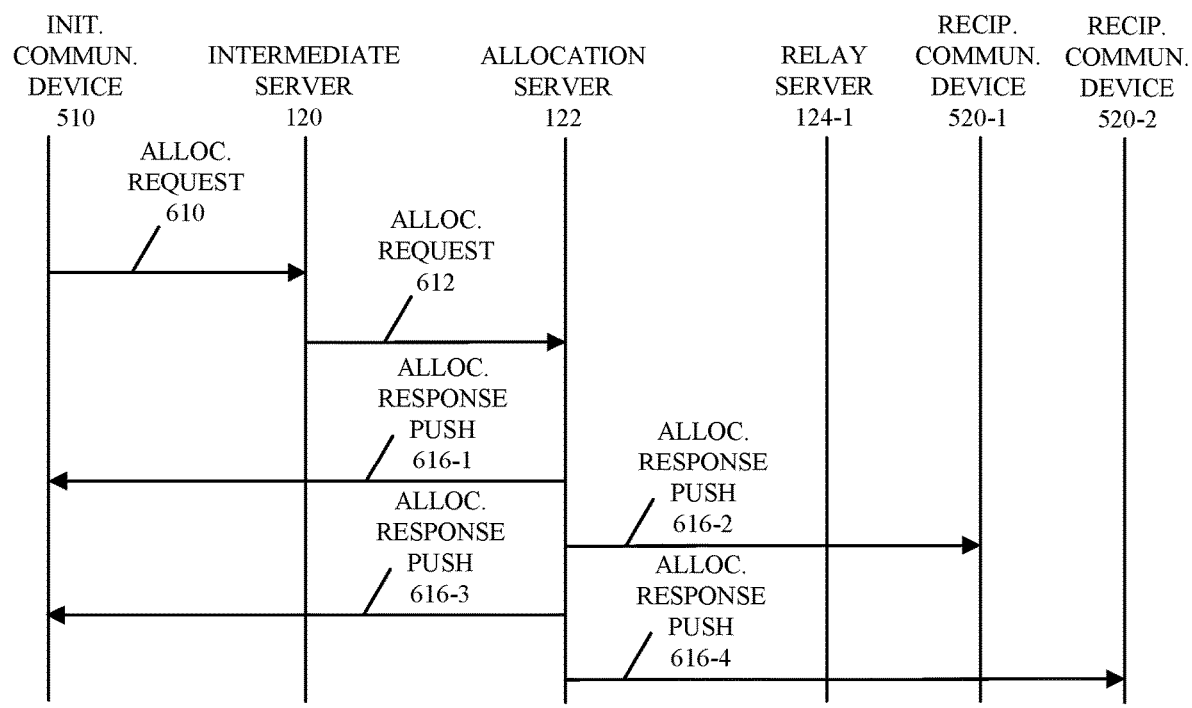
FIG. 6 is a flow diagram illustrating an allocation operation during communication among at least some of the electronic devices in FIG. 1.

FIG. 6 presents a flow diagram illustrating an allocation operation during communication among at least some of the electronic devices in FIG. 1. During the allocation operation, initiating communication device 510 may transmit an allocation request 610 (which is sometimes referred to as an 'allocate request') to intermediate server 120, which then sends an allocate request 612 to allocation server 122. In response to allocate request 612, allocation server 122 may transmit one or more allocate response push 616 messages (which are sometimes referred to as an 'allocate responses') to initiating communication device 510 and/or one or more allocate response push messages 616 to one or more recipient communication devices 520, e.g., recipient communication devices 520-1 and 520-2. In some cases, each pair of allocation response push messages corresponds to a different recipient communication device 520, e.g., allocation response push messages 616-1 and 616-2 correspond to recipient communication device 520-1, while allocation response push messages 616-3 and 616-4 correspond to recipient communication device 520-2. Note that the one or more allocate response push messages 616 may include information, such as: a relay-server address, a relay-session identifier, a relay-session key (e.g., an encryption key or a secure hashing function), and/or a relay-session token. In some embodiments, instead of first performing the invitation operation in FIG. 5, initiating communication device 510 may start establishing a communication session using the allocation operation.

Figure 7:
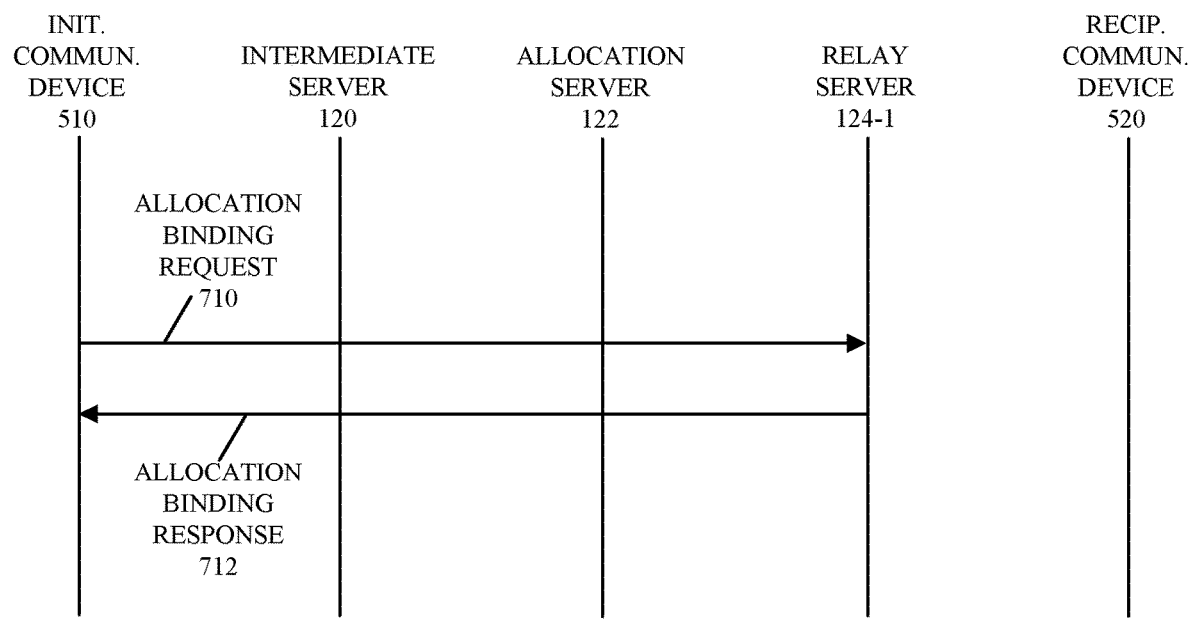
FIG. 7 is a flow diagram illustrating an allocation-binding operation during communication among at least some of the electronic devices in FIG. 1.

After the invitation operation and/or the allocation operation, an allocation-binding operation may be performed. This is shown in FIG. 7, which presents a flow diagram illustrating an allocation-binding operation during communication among at least some of the electronic devices in FIG. 1. During the allocation-binding operation, initiating communication device 510 may send an allocation binding request 710, e.g., an 'Allocbind Request', to relay server 124-1 using the relay-server address to bind the initiating communication device 510 and relay server 124-1 in the communication session. This allocation binding request may include information such as: a requested transport type (e.g., User Datagram Protocol or UDP), message-integrity information (e.g., the relay-session key, which may include or specify a secure hashing function, such as SHA-20), the relay-session token, optional software and/or optional data. In response, relay server 124-1 may transmit an allocation binding response 712, e.g., an 'Allocbind Response', (which may also sometimes referred to as a 'binding success response'). This allocation binding response may include information such as: a mapped address (e.g., an XOR-mapped address), a channel number, optional software and/or message-integrity information. For example, the channel number may be specified using a 4B header, with 2B for the channel number and 2B for the length. However, a wide variety of data formats and/or lengths may be used for the channel number. Note that the allocation binding may reserve resources for or set up a connection between initiating communication device 510 and relay server 124-1 for use in the communication session.

Figure 8:
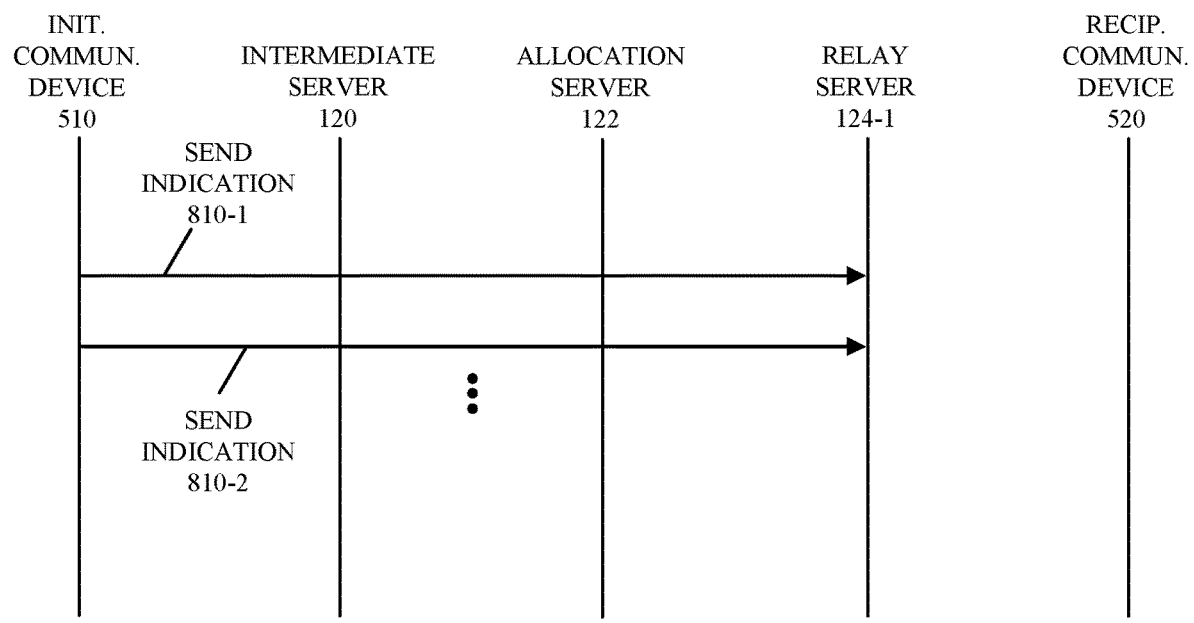
FIG. 8 is a flow diagram illustrating a session-connected-initiation operation during communication among at least some of the electronic devices in FIG. 1.

Next, a session-connected-initiation operation may be performed. This is shown in FIG. 8, which presents a flow diagram illustrating a session-connected-initiation operation during communication among at least some of the electronic devices in FIG. 1. During the session-connection-initiation operation, initiating communication device 510 may transmit a send indication 810-1 (which is sometimes referred to as a 'connection indication') to relay server 124-1 using the relay-server address to confirm a connection between initiating communication device 510 and relay server 124-1 in the communication session. This send indication may indicate that the initiator (initiating communication device 510) is connected, and may include information such as: the transport type, a radio access technology or RAT (e.g., Wi-Fi), MTU, and/or a local address. Note that instances of send indication 810-1 may be repeated until a response is received from recipient communication device 520 (as described further below with reference to FIG. 11).

Figure 9:
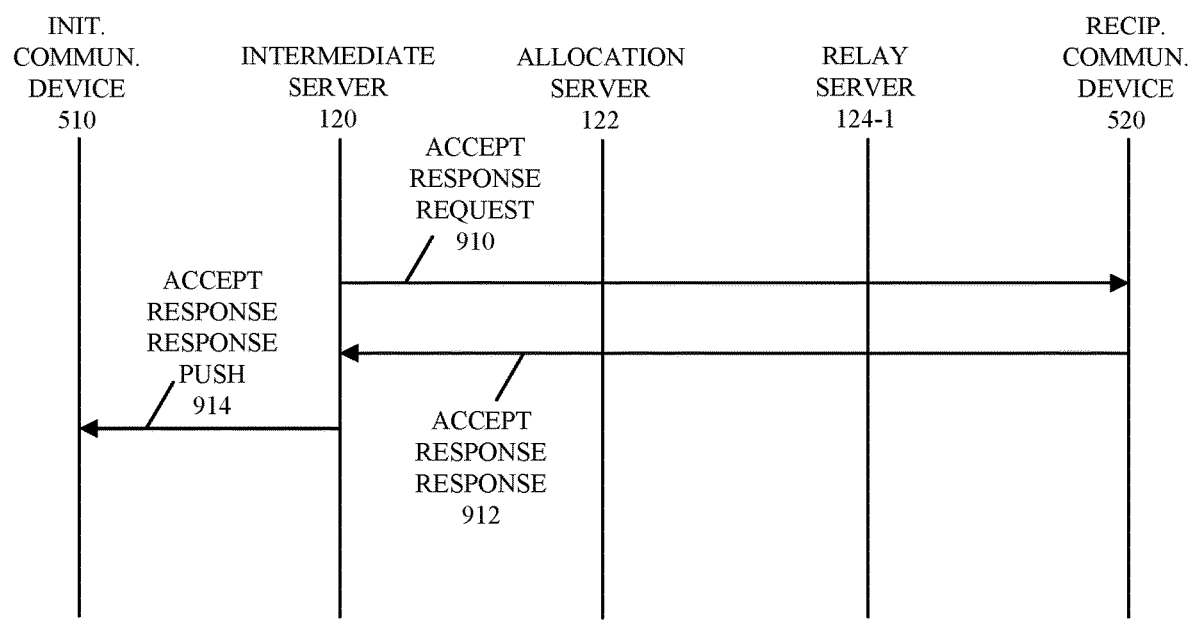
FIG. 9 is a flow diagram illustrating an accept-response operation during communication among at least some of the electronic devices in FIG. 1.

In response to the invitation operation and/or the allocation operation, recipient communication device 520 may perform an accept-response operation. This is shown in FIG. 9, which presents a flow diagram illustrating an accept-response operation during communication among at least some of the electronic devices in FIG. 1. During the accept-response operation, intermediate server 120 may transmit, to recipient communication device 520, an accept response request 910, and may receive, from recipient communication device 520, an accept response 912. Then, intermediate server 120 may send, to initiating communication device 510, an accept response push 914 (which is sometimes referred to as 'acceptance response'). Note that the accept-response operation may be used by recipient communication device 520 to communicate that it accepts the invitation for the communication session to initiating communication device 510.

Figure 10:
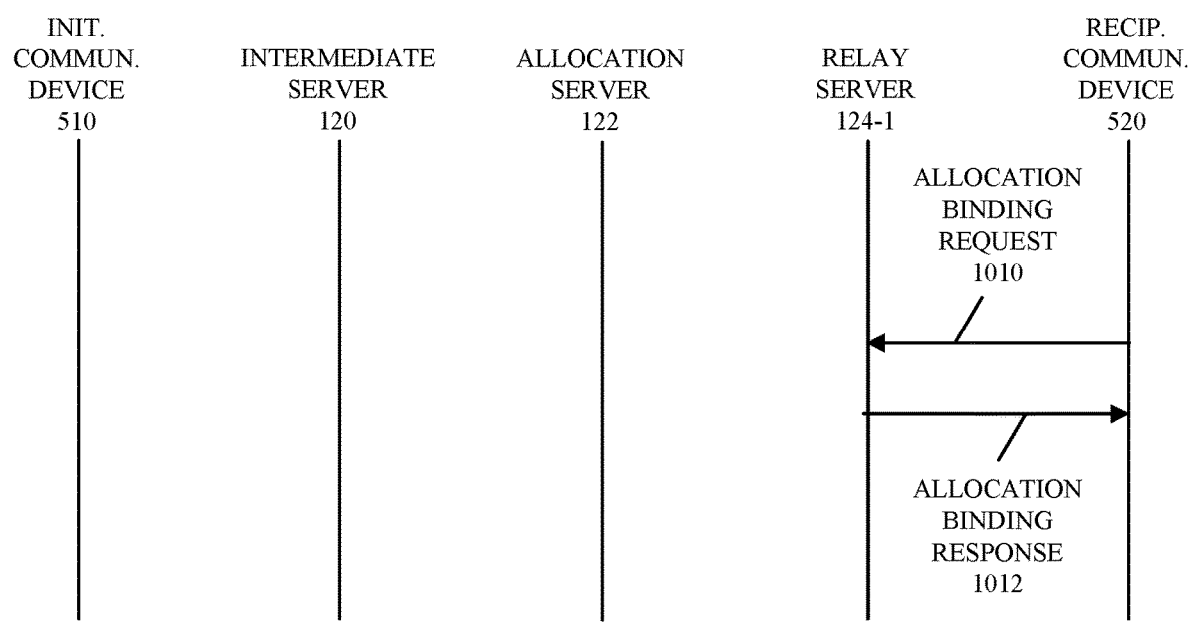
FIG. 10 is a flow diagram illustrating an allocation-binding operation during communication among at least some of the electronic devices in FIG. 1.

After accepting the invitation for the communication session, recipient communication device 520 may perform an allocation-binding operation. This is shown in FIG. 10, which presents a flow diagram illustrating an allocation-binding operation during communication among at least some of the electronic devices in FIG. 1. During the allocation binding, recipient communication device 520 may send an allocation binding request 1010, e.g., an 'Allocbind Request' to relay server 124-1 using the relay-server address to bind recipient communication device 520 and relay server 124-1 in the communication session. This allocation binding request may include information such as: a requested transport type (e.g., User Datagram Protocol or UDP), message-integrity information (e.g., the relay-session key, which may include or specify a secure hashing function, such as SHA-20), the relay-session token, optional software and/or optional data. In response, relay server 124-1 may transmit an allocation binding response 1012, e.g., an 'Allocbind Response'. This allocation binding response may include information such as: a mapped address (e.g., an XOR-mapped address), a channel number, optional software and/or message-integrity information. For example, the channel number may be specified using a 4B header, with 2B for the channel number and 2B for the length. However, a wide variety of data formats and/or lengths may be used for the channel number. Note that the allocation binding may reserve resources for or set up a connection between recipient communication device 520 and relay server 124-1 for use in the communication session.

Figure 11:
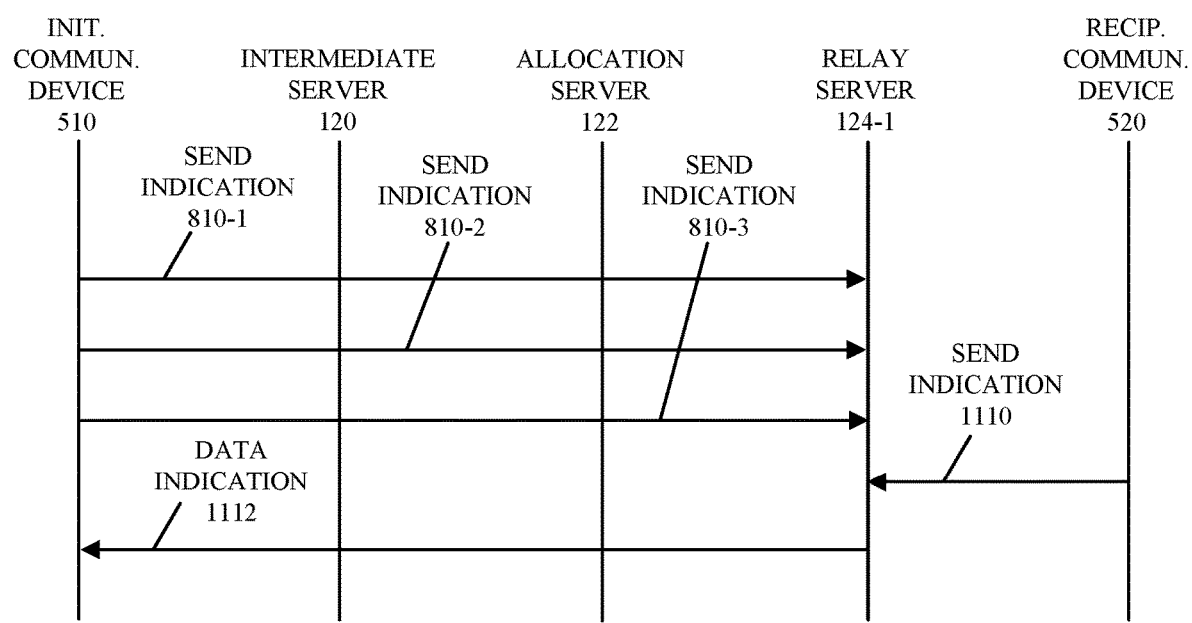
FIG. 11 is a flow diagram illustrating a session-connected-acknowledgment operation during communication among at least some of the electronic devices in FIG. 1.

After the allocation-binding operation, recipient communication device 520 may perform a session-connected-acknowledgment operation. This is shown in FIG. 11, which presents a flow diagram illustrating a session-connected-acknowledgment operation during communication among at least some of the electronic devices in FIG. 1. During the session-connected-acknowledgment operation, initiating communication device 510 may continue to transmit instances of send indications 810 to relay server 124-1 using the relay-server address. Then, recipient communication device 520 may transmit, to relay server 124-1, send indication 1110 (which is sometimes referred to as a 'session-connected response') to acknowledge that recipient communication device 520 is connected. After receiving send indication 1110, relay server 124-1 may send data indication 1112 (which is also sometimes referred to as a 'session-connected response') to initiating communication device 510 to confirm a connection between recipient communication device 520 and relay server 124-1 in the communication session, and thus to indicate that the communication session has been established.

In addition to the aforementioned operations that can be used to establish the communication session, the communication protocol may include or define addition operations. For example, relay server 124-1 may initiate a reallocation or transition of the communication session from relay server 124-1 to another relay server, such as relay server 124-2. This reallocation may be initiated based on locations or addresses (such as an Internet Protocol or IP address) of one or more of initiating communication device 510, relay server 124-1, relay server 124-2 and/or recipient communication device 520. Alternatively or additionally, the reallocation may be based on: the communication performance during the communication session (such as latency), load balancing, etc.

Figure 12:
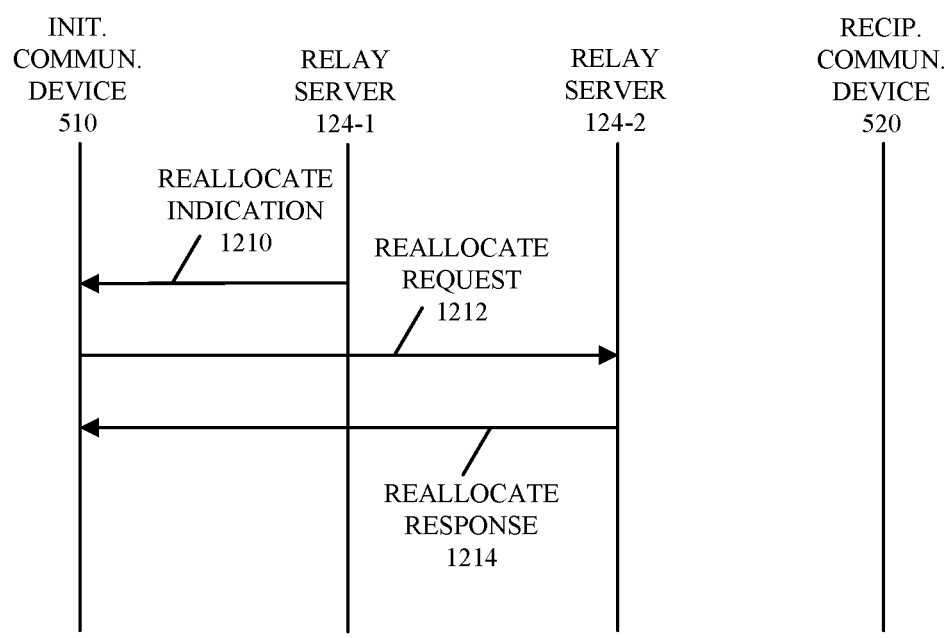
FIG. 12 is a flow diagram illustrating a reallocation operation during communication among at least some of the electronic devices in FIG. 1.

FIG. 12 presents a flow diagram illustrating a reallocation operation during communication among at least some of the electronic devices in FIG. 1. During the reallocation operation, relay server 124-1 may transmit, to initiating communication device 510 a reallocate indication 1210 that suggests or indicates that another relay server (such as relay server 124-2) should be used during the communication session. This reallocate indication 1210 may include: a reallocation token, a mapped address (such as an XOR-mapped address, e.g., an IP address of initiating communication device 510), a channel number, a relayed address of relay server 124-2 (such as an XOR-mapped relayed address, e.g., an IP address of recipient communication device 520), a session identifier and/or message-integrity information. In response, initiating communication device 510 may send, to relay server 124-2, a reallocate request 1212, and may receive back a reallocate response 1214.

Figure 13:
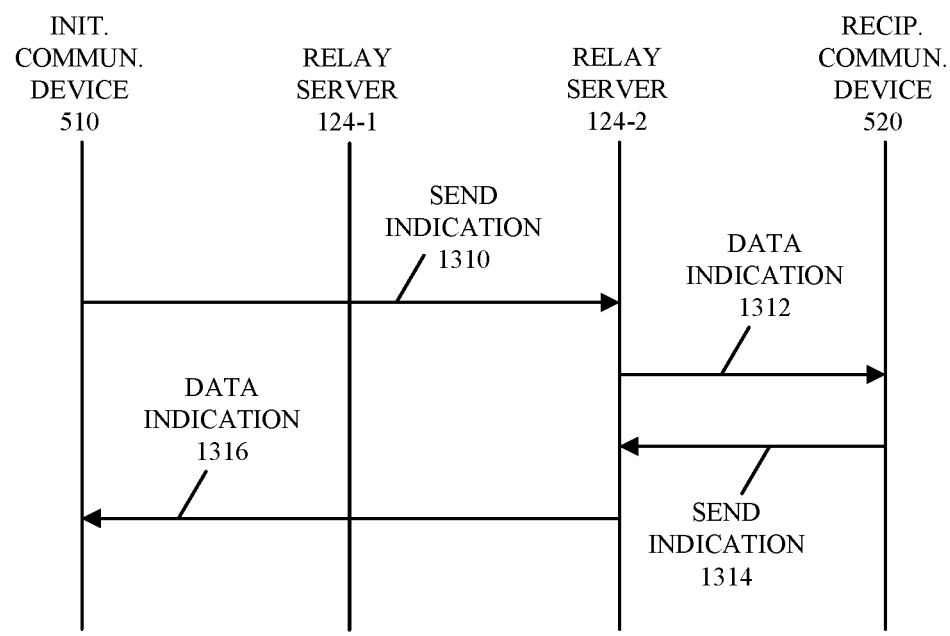
FIG. 13 is a flow diagram illustrating a reallocation-ping operation during communication among at least some of the electronic devices in FIG. 1.

Afterwards, initiating communication device 510 may perform a reallocation-ping operation to confirm data transfer is successful using relay server 124-2. This is shown in FIG. 13, which presents a flow diagram illustrating a reallocation-ping operation during communication among at least some of the electronic devices in FIG. 1. During the reallocation-ping operation, initiating communication device 510 may transmit, to relay server 124-2, a send indication 1310 that determines whether recipient communication device 520 is ready for the reallocation (e.g., send indication 1310 may include a heartbeat request to confirm that the communication session is still valid). In response, relay server 124-2 may send a data indication 1312 to recipient communication device 520, which may include the heartbeat request. Then, recipient communication device 520 may transmit, to relay server 124-2, a send indication 1314, which may include the heartbeat response of recipient communication device 520. Next, relay server 124-2 may send a data indication 1316 (which may include the heartbeat response) to initiating communication device 510, which may indicate that the reallocation is completed.

Figure 14:
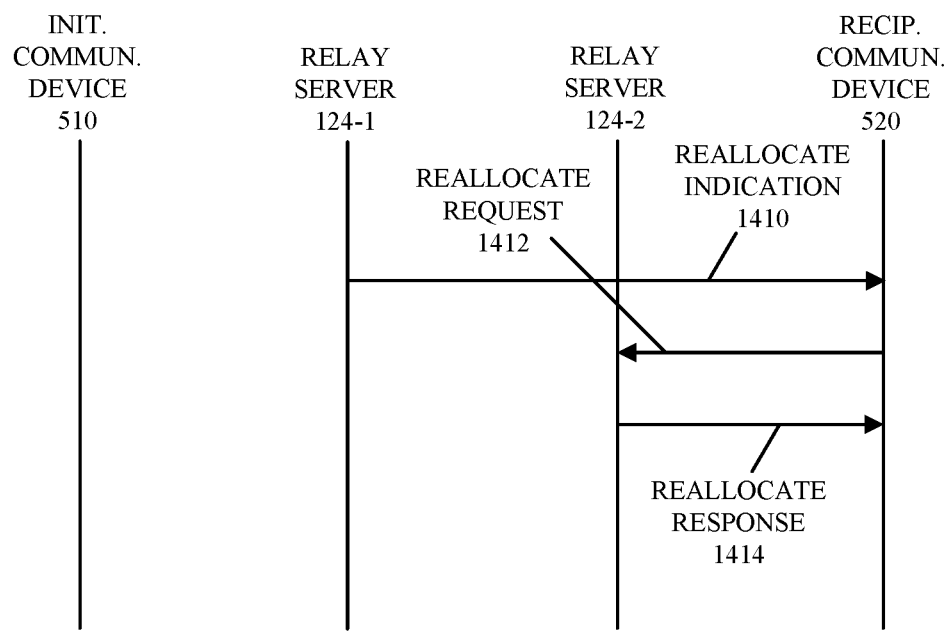
FIG. 14 is a flow diagram illustrating a reallocation operation during communication among at least some of the electronic devices in FIG. 1.

Alternatively, relay server 124-1 may perform the reallocation operation with recipient communication device 520. This is shown in FIG. 14, which presents a flow diagram illustrating a reallocation operation during communication among at least some of the electronic devices in FIG. 1. During the reallocation operation, relay server 124-1 may transmit, to recipient communication device 520 a reallocate indication 1410 that suggests or indicates that another relay server (such as relay server 124-2) should be used during the communication session. This reallocate indication 1410 may include: a reallocation token, a mapped address (such as an XOR-mapped address), a channel number, a relayed address of relay server 124-2 (such as an XOR-mapped relayed address), a session identifier and/or message-integrity information. In response, recipient communication device 520 may send, to relay server 124-2, a reallocation request 1412, and may receive back a reallocation response 1414.

Figure 15:
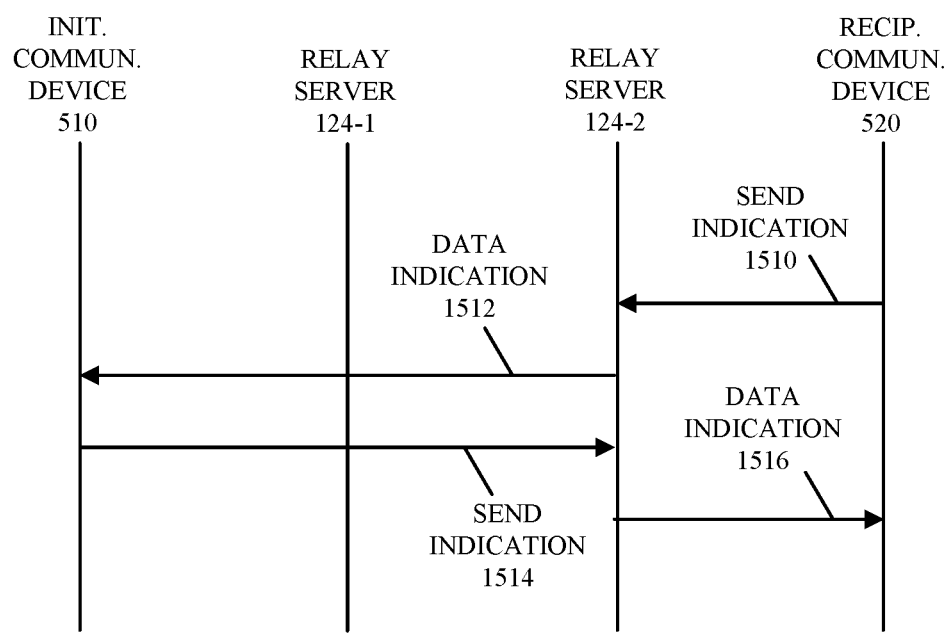
FIG. 15 is a flow diagram illustrating a reallocation-ping operation during communication among at least some of the electronic devices in FIG. 1.

Next, recipient communication device 520 may perform a reallocation-ping operation. This is shown in FIG. 15, which presents a flow diagram illustrating a reallocation-ping operation during communication among at least some of the electronic devices in FIG. 1. During the reallocation-ping operation, recipient communication device 520 may transmit, to relay server 124-2, a send indication 1510 that determines whether initiating communication device 510 is ready for the reallocation (e.g., send indication 1510 may include a heartbeat request to confirm that the communication session is still valid). In response, relay server 124-2 may send a data indication 1512 to initiating communication device 510, which may include the heartbeat request. Then, initiating communication device 510 may transmit, to relay server 124-2, a send indication 1514, which may include the heartbeat response of initiating communication device 510. Next, relay server 124-2 may send a data indication 1516 (which may include the heartbeat response) to recipient communication device 520, which may indicate that the reallocation is completed.

Figure 16:
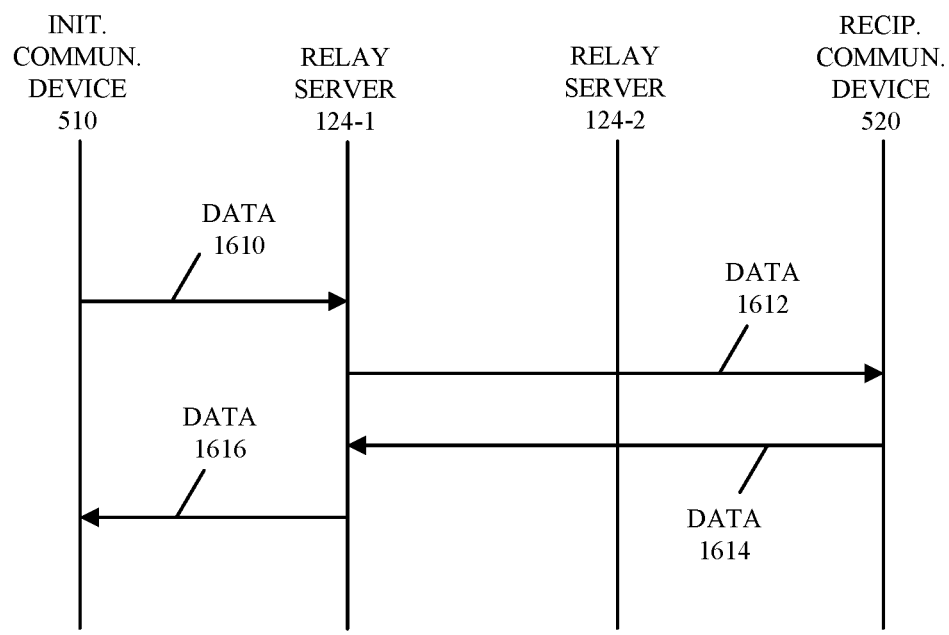
FIG. 16 is a flow diagram illustrating a data operation during communication among at least some of the electronic devices in FIG. 1.

Once the communication session has been established, either of initiating communication device 510 and recipient communication device 520 can use the communication session to communicate data or information via relay server 124-1 (or relay server 124-2 after a reallocation operation). This is shown in FIG. 16, which presents a flow diagram illustrating a data operation during communication among at least some of the electronic devices in FIG. 1. During the data operation, initiating communication device 510 may transmit, to relay server 124-1, data 1610 with a channel data message, and in response relay server 124-1 may transmit data 1612 to recipient communication device 520. Data 1612 can convey the same content as data 1610, but can be represented in a different format, e.g., based on different encoding. Alternatively or additionally, recipient communication device 520 may transmit, to relay server 124-1, data 1614 with a channel data message, and in response relay server 124-1 may transmit data 1616 to initiating communication device 510. Similarly, data 1616 can convey the same content as data 1614, but can be represented in a different format, e.g., based on different encoding.

Figure 17:
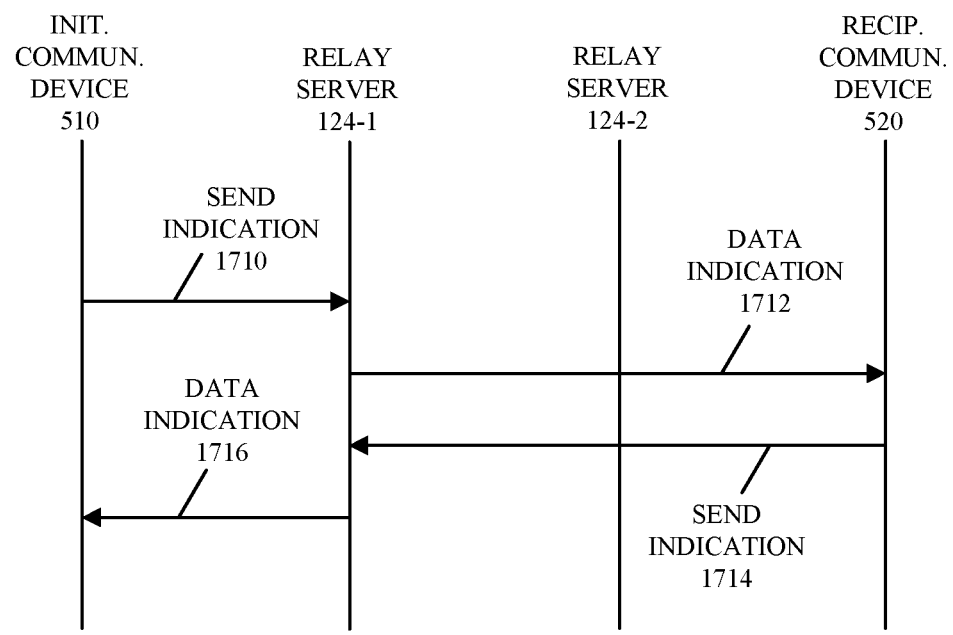
FIG. 17 is a flow diagram illustrating an idle heartbeat operation during communication among at least some of the electronic devices in FIG. 1.

In some embodiments, either of initiating communication device 510 and recipient communication device 520 may perform an idle heartbeat operation after a time interval (such as 10-30 s, e.g., 20 s) without activity in the communication session to keep the communication-session alive. This is shown in FIG. 17, which presents a flow diagram illustrating an idle heartbeat operation during communication among at least some of the electronic devices in FIG. 1. During the idle heartbeat operation, initiating communication device 510 may transmit, to relay server 124-1, a send indication 1710 with an idle heartbeat request. In response, relay server 124-1 may send, to recipient communication device 520, a data indication 1712 with the idle heartbeat request. Alternatively or additionally, recipient communication device 520 may transmit, to relay server 124-1, a send indication 1714 with an idle heartbeat request. In response, relay server 124-1 may send, to initiating communication device 510, a data indication 1716 with the idle heartbeat request. Note that the operations during the idle heartbeat operation may be repeated for as long as it is desirable to maintain the communication session.

Figure 18:
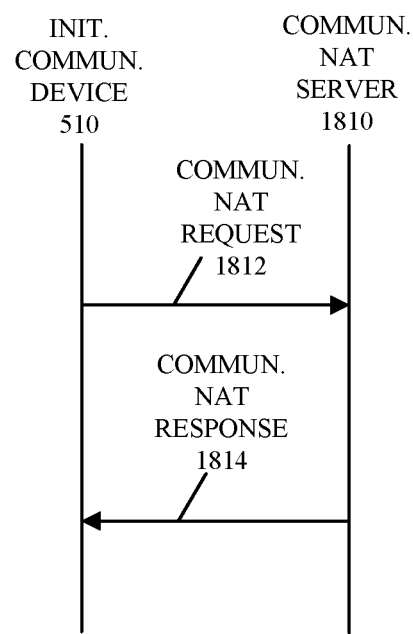
FIG. 18 is a flow diagram illustrating a communication network address translation (NAT) discovery operation during communication among at least some of the electronic devices in FIG. 1.

Moreover, initiating communication device 510 may perform a communication network address translation (NAT) discovery operation to discover public IP addresses of a local interface, which can be used to set up a P2P link. This is shown in FIG. 18, which presents a flow diagram illustrating a communication NAT discovery operation during communication among at least some of the electronic devices in FIG. 1. During the communication NAT discovery operation, initiating communication device 510 may transmit, to communication NAT server 1810, a communication NAT request 1812 for the public IP address of a local interface. In response, communication NAT server 1810 may send, to initiating communication device 510, a communication NAT response 1814 with the public IP address of the local interface. Note that the communication NAT discovery operation may be repeated for each of the local interfaces.

Figure 19:
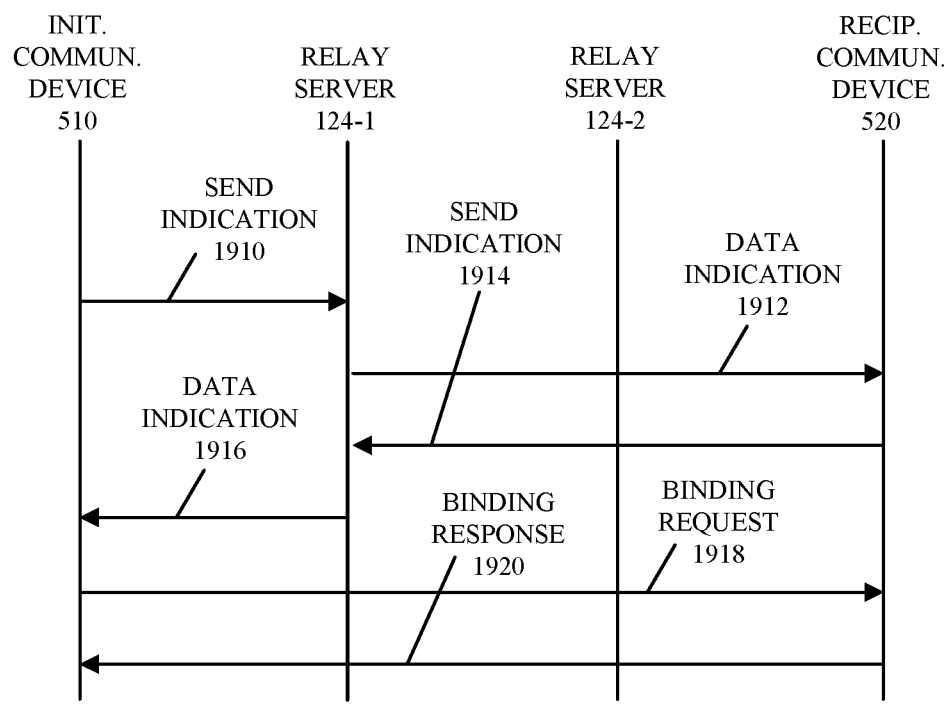
FIG. 19 is a flow diagram illustrating a P2P establishment operation during communication among at least some of the electronic devices in FIG. 1.

Furthermore, either initiating communication device 510 or recipient communication device 520 may perform a P2P establishment operation. This is shown in FIG. 19, which presents a flow diagram illustrating a P2P establishment operation during communication among at least some of the electronic devices in FIG. 1. During the P2P establishment operation, initiating communication device 510 may transmit, to relay server 124-1, a send indication 1910 with connection data. In response, relay server 124-1 may send a data indication 1912 to recipient communication device 520, which may include the connection data. Then, recipient communication device 520 may transmit, to relay server 124-1, a send indication 1914, which may include a connection-data acknowledgment. Next, relay server 124-1 may send a data indication 1916 (which may include the connection-data acknowledgment) to initiating communication device 510. Subsequently, initiating communication device 510 may transmit a binding request 1918 to recipient communication device 520, and may receive a binding response 1920 in response. This may set up and confirm that a P2P link has been established.

Figure 20:
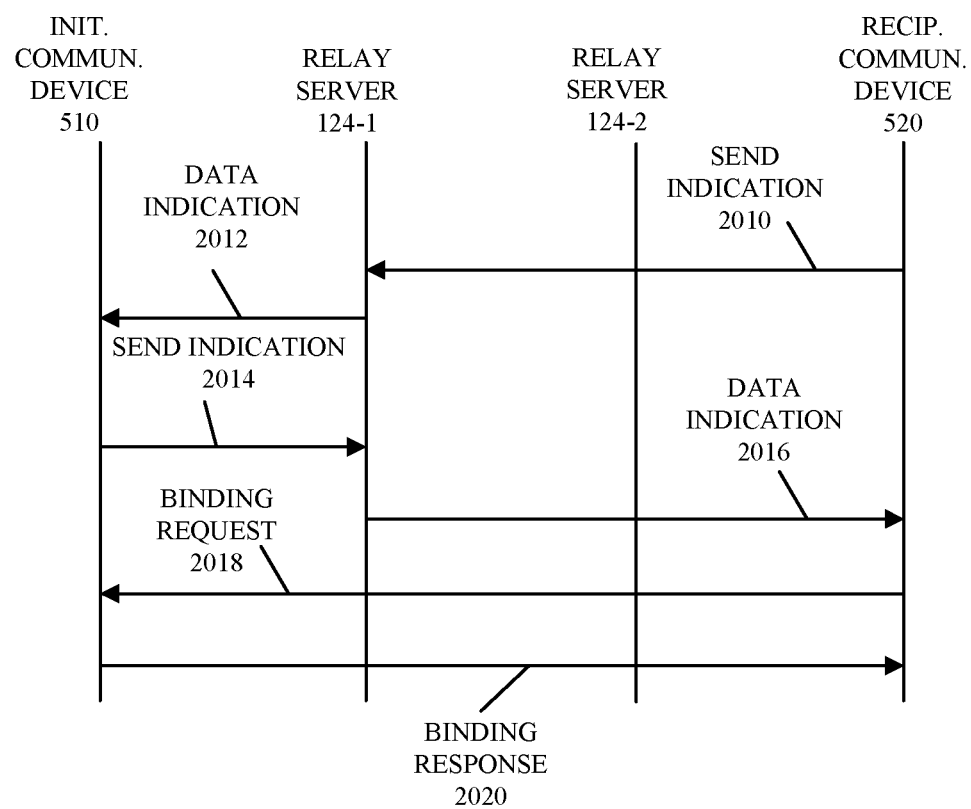
FIG. 20 is a flow diagram illustrating a P2P establishment operation during communication among at least some of the electronic devices in FIG. 1.

Alternatively, FIG. 20 presents a flow diagram illustrating a P2P establishment operation during communication among at least some of the electronic devices in FIG. 1. During the P2P establishment operation, recipient communication device 520 may transmit, to relay server 124-1, a send indication 2010 with connection data. In response, relay server 124-1 may send a data indication 2012 to initiating communication device 510, which may include the connection data. Then, initiating communication device 510 may transmit, to relay server 124-1, a send indication 2014, which may include a connection-data acknowledgment. Next, relay server 124-1 may send a data indication 2016 (which may include the connection-data acknowledgment) to recipient communication device 520. Subsequently, recipient communication device 520 may transmit a binding request 2018 to initiating communication device 510, and may receive a binding response 2020 in response. This may set up and confirm that a P2P link has been established.

Figure 21:
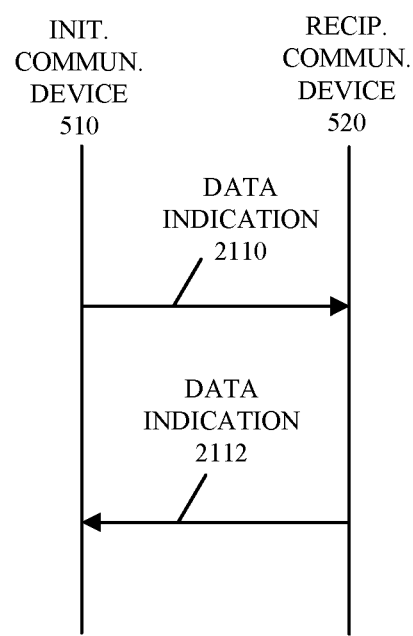
FIG. 21 is a flow diagram illustrating a nomination operation during communication among at least some of the electronic devices in FIG. 1.

Additionally, either initiating communication device 510 or recipient communication device 520 may perform a nomination operation to suggest or indicate that there is a better link for use in P2P communication. This is shown in FIG. 21, which presents a flow diagram illustrating a nomination operation during communication among at least some of the electronic devices in FIG. 1. During the nomination operation, initiating communication device 510 may transmit, to recipient communication device 520, a data indication 2110 with information that indicates or specifies a nomination. In response, recipient communication device 520 may send, to initiating communication device 510, a data indication 2112 with a nomination acknowledgment.

Figure 22:
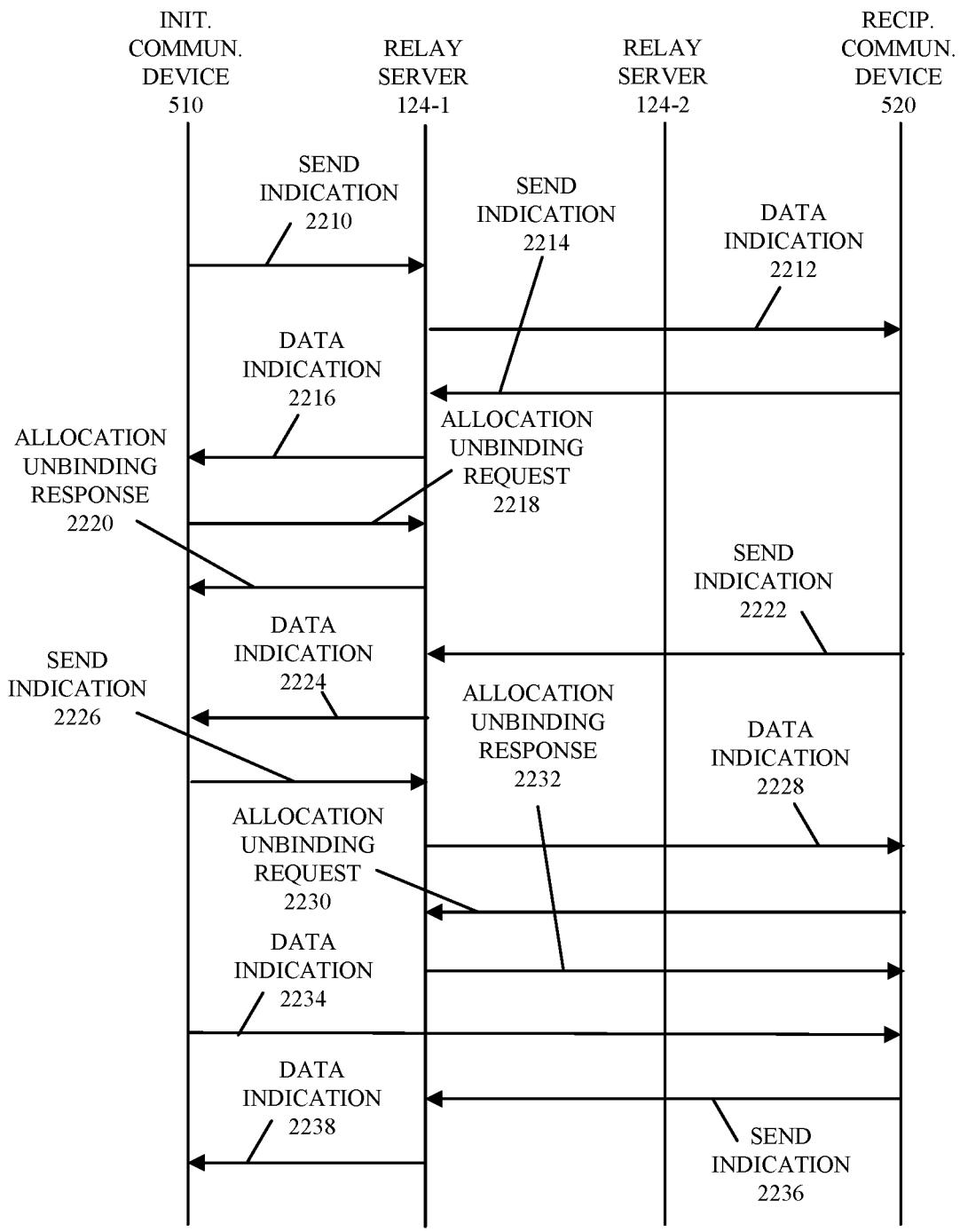
FIG. 22 is a flow diagram illustrating a disconnect operation during communication among at least some of the electronic devices in FIG. 1.

In some embodiments, either initiating communication device 510 or recipient communication device 520 may perform a disconnect operation if a communication session has been idle (e.g., without activity) for at least a time interval (such as 10-30 s) or if a disconnect is desired. This is shown in FIG. 22, which presents a flow diagram illustrating a disconnect operation during communication among at least some of the electronic devices in FIG. 1. During the disconnect operation, instead of transmitting a send indication with heartbeat request to relay server 124-1, which is then forwarded as a data indication, a disconnect message may be sent. As shown in FIG. 22, initiating communication device 510 may transmit, to relay server 124-1, a send indication 2210 with a disconnect request. In response, relay server 124-1 may send a data indication 2212 to recipient communication device 520, which may include the disconnect request. Then, recipient communication device 520 may transmit, to relay server 124-1, a send indication 2214, which may include a disconnect acknowledgment. Next, relay server 124-1 may send a data indication 2216 (which may include the disconnect acknowledgment) to initiating communication device 510. Subsequently, initiating communication device 510 may transmit an allocation unbinding request 2218, e.g., an 'UnAllocbind Request', (which is sometimes referred to an 'un-allocation binding request') to relay server 124-1, and may receive an allocation unbinding response 2220, e.g., an 'UnAllocbind Response', (which is sometimes referred to an 'un-allocation binding response') in response. This may confirm that the communication session has disconnected.

Alternatively, recipient communication device 520 may transmit, to relay server 124-1, a send indication 2222 with a disconnect request. In response, relay server 124-1 may send a data indication 2224 to initiating communication device 510, which may include the disconnect request. Then, initiating communication device 510 may transmit, to relay server 124-1, a send indication 2226, which may include a disconnect acknowledgment. Next, relay server 124-1 may send a data indication 2228 (which may include the disconnect acknowledgment) to recipient communication device 520. Subsequently, recipient communication device 520 may transmit an allocation unbinding request 2230, e.g., an 'UnAllocbind Request', to relay server 124-1, and may receive an allocation unbinding response 2232, e.g., an 'UnAllocbind Response', in response. This may confirm that the communication session has been disconnected.

Moreover, if a P2P link has been established, initiating communication device 510 may transmit, to recipient communication device 520, data indication 2234 with a disconnect request. In response, recipient communication device 520 may send, to relay server 124-1, a send indication 2236 with the disconnect request, and relay server 124-1 may transmit, to initiating communication device 510, a data indication 2238 with the disconnect request. This may confirm that the P2P link has been disconnected.

In some embodiments, if a heartbeat request is not communicated in the communication session after the time interval has elapsed, the communication session may timeout and may be discontinued or disconnected by initiating communication device 510 and/or recipient communication device 520 without further communication.

Figure 23:
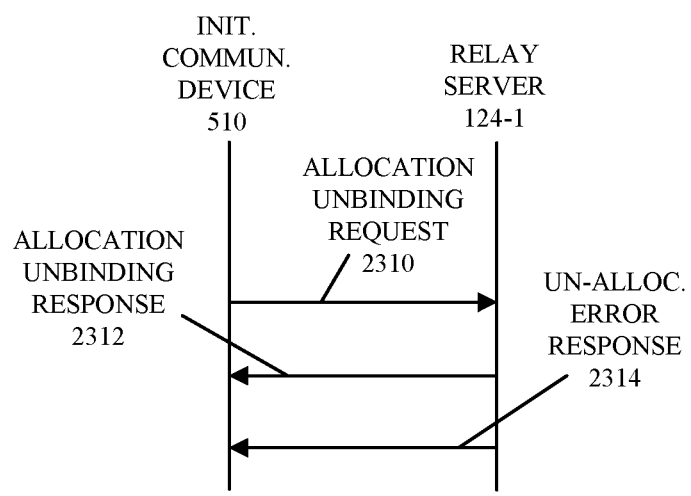
FIG. 23 is a flow diagram illustrating an un-allocation binding operation during communication among at least some of the electronic devices in FIG. 1.

After the communication session is disconnected, either initiating communication device 510 or recipient communication device 520 may perform an allocation unbinding operation (which may also be referred to as an un-allocation binding operation) with relay server 124-1. This is shown in FIG. 23, which presents a flow diagram illustrating an allocation unbinding operation during communication among at least some of the electronic devices in FIG. 1. During the allocation unbinding operation, initiating communication device 510 may send an allocation unbinding request 2310, e.g., an 'UnAllocbind Request', to relay server 124-1. This allocation unbinding request may include the session identifier and/or the message-integrity information. In response, relay server 124-1 may transmit, to initiating communication device 510 an allocation unbinding response 2312, e.g., an 'UnAllocbind Response', (with the session identifier and/or the message-integrity information) if it was successful, or an un-allocation error response 2314 (with an error code) if it was not successful.

Figure 24:
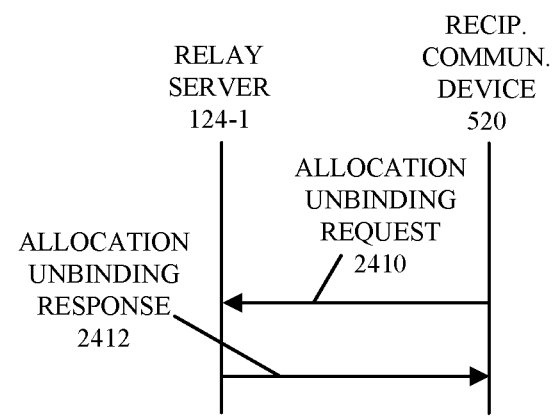
FIG. 24 is a flow diagram illustrating an un-allocation binding operation during communication among at least some of the electronic devices in FIG. 1.

Alternatively, as shown in FIG. 24, which presents a flow diagram illustrating an allocation unbinding operation (which may also be referred to as an un-allocation binding operation) during communication among at least some of the electronic devices in FIG. 1, recipient communication device 520 may send an allocation unbinding request 2410, e.g., an 'UnAllocbind Request', to relay server 124-1. This allocation unbinding request may include the session identifier and/or the message-integrity information. In response, relay server 124-1 may transmit, to recipient communication device 520 an allocation unbinding response 2412, e.g., an 'UnAllocbind Response', (with the session identifier and/or the message-integrity information) if it was successful.

We now describe embodiments of an electronic device. FIG. 25 presents a block diagram of an electronic device 2500 (which may be an access point, another electronic device, such as a station, an initiating communication device or a recipient communication device) in accordance with some embodiments. This electronic device includes processing subsystem 2510, memory subsystem 2512, and networking subsystem 2514. Processing subsystem 2510 includes one or more devices configured to perform computational operations. For example, processing subsystem 2510 can include one or more microprocessors, application-specific integrated circuits (ASICs), microcontrollers, programmable-logic devices, and/or one or more digital signal processors (DSPs).

Memory subsystem 2512 includes one or more devices for storing data and/or instructions for processing subsystem 2510 and networking subsystem 2514. For example, memory subsystem 2512 can include dynamic random access memory (DRAM), static random access memory (SRAM), a read-only memory (ROM), flash memory, and/or other types of memory. In some embodiments, instructions for processing subsystem 2510 in memory subsystem 2512 include: one or more program modules or sets of instructions (such as program module 2522 or operating system 2524), which may be executed by processing subsystem 2510. For example, a ROM can store programs, utilities or processes to be executed in a non-volatile manner, and DRAM can provide volatile data storage, and may store instructions related to the operation of electronic device 2500. Note that the one or more computer programs may constitute a computer-program mechanism, a computer-readable storage medium or software. Moreover, instructions in the various modules in memory subsystem 2512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 2510. In some embodiments, the one or more computer programs are distributed over a network-coupled computer system so that the one or more computer programs are stored and executed in a distributed manner.

In addition, memory subsystem 2512 can include mechanisms for controlling access to the memory. In some embodiments, memory subsystem 2512 includes a memory hierarchy that comprises one or more caches coupled to a memory in electronic device 2500. In some of these embodiments, one or more of the caches is located in processing subsystem 2510.

In some embodiments, memory subsystem 2512 is coupled to one or more high-capacity mass-storage devices (not shown). For example, memory subsystem 2512 can be coupled to a magnetic or optical drive, a solid-state drive, or another type of mass-storage device. In these embodiments, memory subsystem 2512 can be used by electronic device 2500 as fast-access storage for often-used data, while the mass-storage device is used to store less frequently used data.

Figure 25:
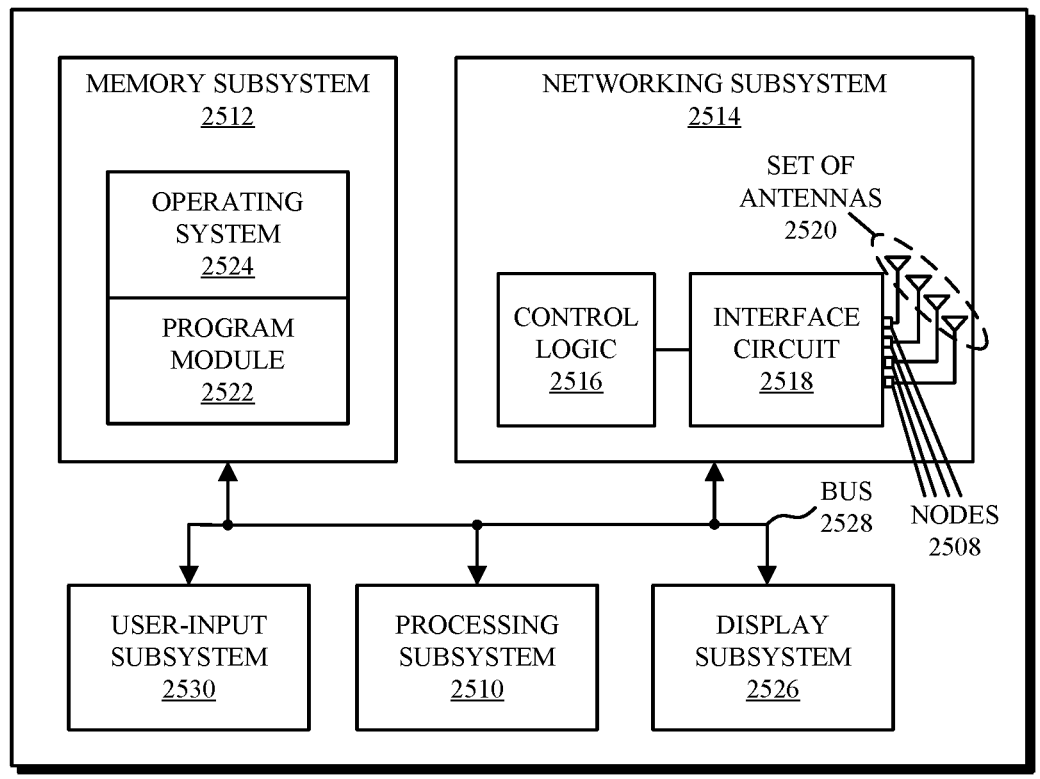
FIG. 25 is a block diagram illustrating an example electronic device, such as one of the electronic devices of FIG. 1.

Networking subsystem 2514 includes one or more devices configured to couple to and communicate on a wired and/or wireless network (i.e., to perform network operations), including: control logic 2516, an interface circuit 2518 and a set of antennas 2520 (or antenna elements) in an adaptive array that can be selectively turned on and/or off by control logic 2516 to create a variety of optional antenna patterns or 'beam patterns.' (While FIG. 25 includes set of antennas 2520, in some embodiments electronic device 2500 includes one or more nodes, such as nodes 2508, e.g., a pad, which can be coupled to set of antennas 2520. Thus, electronic device 2500 may or may not include set of antennas 2520.) For example, networking subsystem 2514 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 2514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 2500 may use the mechanisms in networking subsystem 2514 for performing simple wireless communication between the electronic devices, e.g., transmitting advertising or beacon frames and/or scanning for advertising frames transmitted by other electronic devices.

Within electronic device 2500, processing subsystem 2510, memory subsystem 2512, and networking subsystem 2514 are coupled together using bus 2528 that facilitates data transfer between these components. Bus 2528 may include an electrical, optical, and/or electro-optical connection that the subsystems can use to communicate commands and data among one another. Although only one bus 2528 is shown for clarity, different embodiments can include a different number or configuration of electrical, optical, and/ or electro-optical connections among the subsystems.

In some embodiments, electronic device 2500 includes a display subsystem 2526 for displaying information on a display, which may include a display driver and the display, such as a liquid-crystal display, a multi-touch touchscreen, etc. Display subsystem 2526 may be controlled by processing subsystem 2510 to display information to a user (e.g., information relating to incoming, outgoing, or an active communication session).

Electronic device 2500 can also include a user-input subsystem 2530 that allows a user of the electronic device 2500 to interact with electronic device 2500. For example, user-input subsystem 2530 can take a variety of forms, such as: a button, keypad, dial, touch screen, audio input interface, visual/image capture input interface, input in the form of sensor data, etc.

Electronic device 2500 can be (or can be included in) any electronic device with at least one network interface. For example, electronic device 2500 may include: a cellular telephone or a smart phone, a tablet computer, a laptop computer, a notebook computer, a personal or desktop computer, a netbook computer, a media player device, an electronic book device, a MiFi® device, a smart watch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 2500, in alternative embodiments, different components and/or subsystems may be present in electronic device 2500. For example, electronic device 2500 may include one or more additional processing subsystems, memory subsystems, networking subsystems, and/or display subsystems. Additionally, one or more of the subsystems may not be present in electronic device 2500. Moreover, in some embodiments, electronic device 2500 may include one or more additional subsystems that are not shown in FIG. 25. Also, although separate subsystems are shown in FIG. 25, in some embodiments some or all of a given subsystem or component can be integrated into one or more of the other subsystems or component(s) in electronic device 2500. For example, in some embodiments program module 2522 is included in operating system 2524 and/or control logic 2516 is included in interface circuit 2518.

Moreover, the circuits and components in electronic device 2500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 2514. This integrated circuit may include hardware and/or software mechanisms that are used for transmitting wireless signals from electronic device 2500 and receiving signals at electronic device 2500 from other electronic devices. Aside from the mechanisms herein described, radios are generally known in the art and hence are not described in detail. In general, networking subsystem 2514 and/or the integrated circuit can include any number of radios. Note that the radios in multiple-radio embodiments function in a similar way to the described single-radio embodiments.

In some embodiments, networking subsystem 2514 and/ or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication avoidance technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 2522, operating system 2524 (such as a driver for interface circuit 2518) or in firmware in interface circuit 2518. Alternatively or additionally, at least some of the operations in the communication technique may be implemented in a physical layer, such as hardware in interface circuit 2518. In some embodiments, the communication avoidance technique is implemented, at least in part, in a MAC layer and/or in a physical layer in interface circuit 2518.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An initiating communication device, comprising:
one or more nodes configured to communicatively couple to an antenna; and
an interface circuit, communicatively coupled to the one or more nodes, configured to communicate with an allocation server and a relay server;
a processor, coupled to the interface circuit and memory, configured to execute a program module; and
the memory configured to store the program module, the program module comprising instructions for:
transmitting, to the allocation server, an allocate request for allocation of the relay server;
receiving, from the allocation server, an allocate response information that identifies the relay server;
sending, to the relay server, a binding request to bind the initiating communication device and the relay server in a communication session;
receiving, from the relay server, a binding response;
transmitting, to the relay server, a first connection indication for the communication session, wherein the first connection indication confirms a connection between the initiating communication device and the relay server and specifies a transport type to use for the connection;
receiving, directly or indirectly from a recipient communication device, an acceptance response for the communication session;
sending, to the relay server, a second connection indication, after the recipient communication device has performed a binding with the relay server; and
receiving, from the relay server, a session-connected response that acknowledges that the communication session has been established with the recipient communication device.

2. The initiating communication device of claim 1, wherein the program module further comprises instructions for at least one of:
transmitting first data to the recipient communication device via the relay server, or
receiving second data from the recipient communication device via the relay server.

3. The initiating communication device of claim 1, wherein the initiating communication device transmits the allocation request to the allocation server via an intermediate server.

4. The initiating communication device of claim 3, wherein, the program module further comprises instructions for providing, to the intermediate server, an invitation request to establish the communication session via the relay server.

5. The initiating communication device of claim 1, wherein the information that identifies the relay server comprises an address of the relay server.

6. The initiating communication device of claim 1, wherein:
the binding request specifies a transport type for a connection between the initiating communication device and the relay server in the communication session, and
the binding response specifies a channel number for the communication session.

7. The initiating communication device of claim 1, wherein the first connection indication for the communication session specifies a radio access technology.

8. The initiating communication device of claim 1, wherein the program module further comprises instructions for receiving, from the relay server, a reallocate indication that indicates a second relay server to be used for the communication session.

9. The initiating communication device of claim 8, wherein the program module further comprises instructions for:
sending, to the relay server, a reallocation request;
receiving, from the relay server, a reallocation response; and
communicating, responsive to receipt of the reallocation response, with the recipient communication device via the second relay server.

10. A non-transitory computer-readable storage medium storing instructions that, when executed by a processor included in an initiating communication device, cause the initiating communication device to establish a communication session with a recipient communication device via a relay server, by carrying out one or more operations that comprise:
sending, to an intermediate server, an invitation request to establish the communication session via the relay server;
transmitting, to an allocation server, an allocate request for allocation of the relay server
receiving, from the allocation server, an allocate response comprising information that identifies the relay server;
sending, to the relay server, a binding request to bind the initiating communication device and the relay server in the communication session;
receiving, from the relay server, a binding response;
transmitting, to the relay server, a first connection indication for the communication session, wherein the first connection indication confirms a connection between the initiating communication device and the relay server and specifies a transport type to use for the connection;
receiving, directly or indirectly from the recipient communication device, an acceptance response for the communication session;
sending, to the relay server, a second connection indication, after the recipient communication device has performed the binding with the relay server; and
receiving, from the relay server, a session-connected response that acknowledges that the communication session has been established with the recipient communication device.

11. The non-transitory computer-readable storage medium of claim 10, wherein the operations further comprise at least one of:
transmitting first data to the recipient communication device via the relay server, or
receiving second data from the recipient communication device via the relay server.

12. The non-transitory computer-readable storage medium of claim 10, wherein the initiating communication device transmits the allocate request to the allocation server via the intermediate server.

13. The non-transitory computer-readable storage medium of claim 10, wherein the information that identifies the relay server comprises an address of the relay server.

14. The non-transitory computer-readable storage medium of claim 10, wherein:
the binding request specifies a transport type for a connection between the initiating communication device and the relay server in the communication session, and
the binding response specifies a channel number for the communication session.

15. The non-transitory computer-readable storage medium of claim 10, wherein the first connection indication for the communication session specifies a radio access technology.

16. The non-transitory computer-readable storage medium of claim 10, wherein the operations further comprise receiving, from the relay server, a reallocate indication that indicates a second relay server to be used for the communication session.

17. A method for establishing a communication session with a recipient communication device via a relay server, comprising:
by an initiating communication device:
transmitting, to an allocation server, an allocate request for allocation of the relay server;
receiving, from the allocation server, an allocate response comprising information that identifies the relay server;
sending, to the relay server, a binding request to bind the initiating communication device and the relay server in the communication session;
receiving, from the relay server, a binding response;
transmitting, to the relay server, a first connection indication for the communication session, wherein the first connection indication confirms a connection between the initiating communication device and the relay server and specifies a transport type to use for the connection;
receiving, directly or indirectly from the recipient communication device, an acceptance response for the communication session;
sending, to the relay server, a second connection indication, after the recipient communication device has performed the binding with the relay server;
receiving, from the relay server, a session-connected response that acknowledges that the communication session has been established with the recipient communication device; and
transmitting first data to the recipient communication device via the relay server.

18. The method of claim 17, further comprising receiving second data from the recipient communication device via the relay server.

19. The method of claim 17, further comprising, prior to transmitting the allocate request, sending, to an intermediate server, an invitation request to establish the communication session via the relay server.

20. The method of claim 17, further comprising:
receiving, from the relay server, a reallocate indication that indicates a second relay server to be used for the communication session;
sending, to the relay server, a reallocation request;
receiving, from the relay server, a reallocation response; and
after receiving the reallocation response, communicating with the recipient communication device via the second relay server.

* * * * *